Oct. 1, 1963 R. L. ROST 3,105,645

TAPE RECORDER

Filed July 10, 1961 8 Sheets-Sheet 1

INVENTOR
Richard L. Rost

BY Francis W. Crotty
ATTORNEY

Oct. 1, 1963 R. L. ROST 3,105,645

TAPE RECORDER

Filed July 10, 1961 8 Sheets-Sheet 2

INVENTOR
Richard L. Rost

BY [signature]

ATTORNEY

Oct. 1, 1963 R. L. ROST 3,105,645

TAPE RECORDER

Filed July 10, 1961 8 Sheets-Sheet 3

INVENTOR
Richard L. Rost

BY Francis W. Crotty

ATTORNEY

Oct. 1, 1963 R. L. ROST 3,105,645
TAPE RECORDER
Filed July 10, 1961 8 Sheets-Sheet 4

INVENTOR
Richard L. Rost
BY Francis W. Crotty
ATTORNEY

INVENTOR
Richard L. Rost
BY Francis W. Crotty
ATTORNEY

INVENTOR
Richard L. Rost

BY Francis W. Crotty

ATTORNEY

Oct. 1, 1963 R. L. ROST 3,105,645

TAPE RECORDER

Filed July 10, 1961 8 Sheets-Sheet 7

INVENTOR
Richard L. Rost

BY Francis W. Crotty

ATTORNEY

TAPE RECORDER

Filed July 10, 1961

INVENTOR
Richard L. Rost
BY Francis W. Crotty
ATTORNEY

United States Patent Office 3,105,645
Patented Oct. 1, 1963

3,105,645

TAPE RECORDER

Richard L. Rost, Barrington, Ill., assignor to Zenith Radio Corporation, a corporation of Delaware Filed July 10, 1961, Ser. No. 122,916
11 Claims. (Cl. 242—55.13)

This invention relates to recording and reproducing devices. More specifically, it relates to apparatus for automatically playing one or a plurality of record-bearing members, such as tapes, each respectively housed in a separate cartridge.

There are numerous types of recording and reproducing equipment available and they may be readily divided into two basic classes. In the first class there are those devices which employ two interchangeable reels and have a transport mechanism which moves the record, be it tape or wire, from reel to reel. In the second class there are those devices which employ magazines containing the records. The simplest of devices of the latter class employs a cartridge containing both a supply reel having the record wound thereon and a take-up reel for receiving the record as it is being played. A preferred device of the magazine type utilizes cartridges, individually having a record wound upon a supply reel therein, in conjunction with a single take-up reel serving all cartridges that are played.

Almost all of the machines which utilize the reel to reel transport mechanism require that the operator thread the tape through the transport mechanism and rewind the tape after it has been played. Furthermore, most of the machines will only accept one reel at a time. After a reel has been played it must be rewound, removed, and a new reel inserted and threaded through the machine. The machines that use the two-reel type cartridge eliminate some of the problems of the reel to reel type machine, but the cartridge must be rewound by the operator or played in the reverse direction to get back to the beginning of the first selection on the tape. Each cartridge must be removed from the machine after playing and a new cartridge inserted. Moreover, cartridges containing two reels are necessarily large and are cumbersome to handle and store.

With the development of a recording cartridge containing only a supply reel which is approximately the size of a folded handkerchief, it has been possible to construct a recording and reproducing device for such cartridges which eliminates many of the previously mentioned undesirable characteristics of prior recording apparatus.

In the copending applications of Richard G. Schmid, Serial No. 122,929, Ralph W. Galke et al., Serial No. 122,715, Eugene J. Polley et al., Serial No. 122,930, Maurice E. Hardy, Serial No. 122,934, and Maurice E. Hardy, Serial No. 122,933, all filed concurrently with this application and assigned to the same assignee as the present invention, there are described and claimed devices and apparatus which are closely related to the present invention. Additionally, devices and apparatus closely related to the present invention are described and claimed in a divisional application entitled Tape Recorder filed in the name of Richard L. Rost and in a copending application filed in the name of Eugene J. Polley et al. entitled Tape Recorder both filed September 3, 1963, and both of which are also assigned to the same assignee as the present invention.

It is a primary object of the present invention to develop apparatus which overcomes or minimizes the aforenoted deficiencies and disadvantages of prior recording and reproducing apparatus.

It is a further object of this invention to provide self-threading reeling apparatus which automatically plays a plurality of pre-recorded tapes or wires contained in individual cartridges.

It is also an object of this invention to provide a new and improved sensing mechanism which automatically controls the operation of the recording and reproducing device.

Another object of this invention is to provide recording and reproducing apparatus which reduces the operator's functions to a minimum.

Still another object of this invention is to provide tape recording apparatus which is both inexpensive to manufacture and utilizes a minimum number of components.

In accordance with this invention, the reeling apparatus for winding a flexible tape retained upon a storage reel has a novel sensing arrangement for controlling the programming of the apparatus. More particularly, the apparatus comprises a support member for receiving the storage reel, a take-up reel, and a transport mechanism for moving the tape between the storage and take-up reels. The reeling apparatus further comprises a first sensing means for continuously indicating the number of turns of the tape on the storage reel independently of the thickness of the tape, second sensing means for continuously indicating the number of turns of the tape on the take-up reel independently of the thickness of the tape and switch means coupled to and conjointly controlled by the first and second sensing means for controlling the operation of the transport mechanism.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
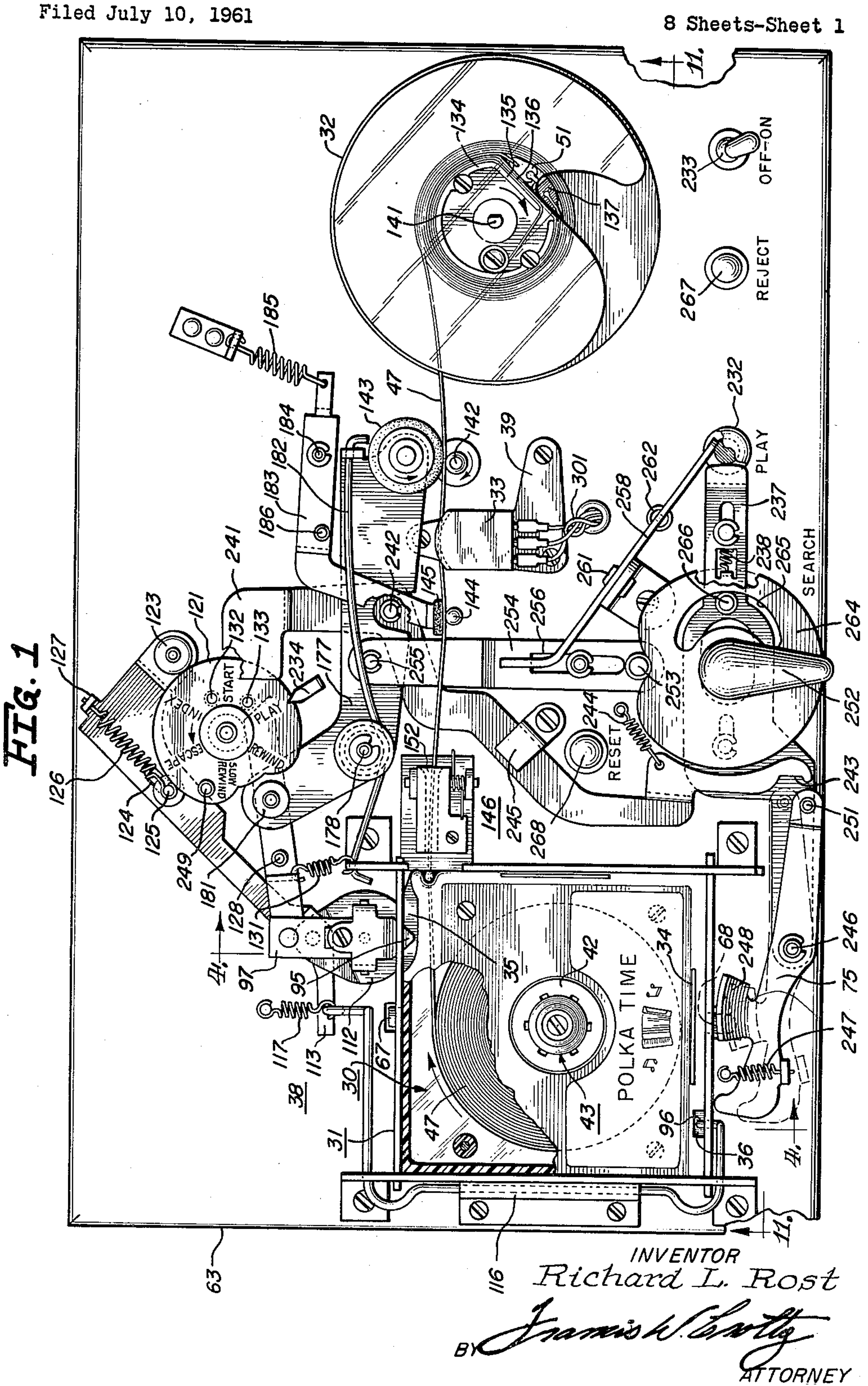
FIGURE 1 is a plan view of the apparatus of the present invention.

The apparatus of FIGURE 1 may be used for transcribing tape, wire or other flexible recording media but, as illustrated, is employed for recording and reproducing on tape. The arrangement is a tape deck or transport which has, as major component parts, one or more cartridges 30 of tape, a storage bin 31 for accommodating such cartridges and a feeding mechanism 38 to present the cartridges seriatim to a playing position, a take-up arrangement including a reel 32 through which tape is presented in coupling or reading relation to a magnetic transducer head 33, a driving system to effect winding of the tape as between the supply and take-up reels, and a programming arrangement through which the several functions are properly correlated in a playing cycle. For convenience, these major components will be considered individually and in the recited order after which a resume of the overall operation will be given.

*Tape Cartridge*

Figures 2, 3, 4:
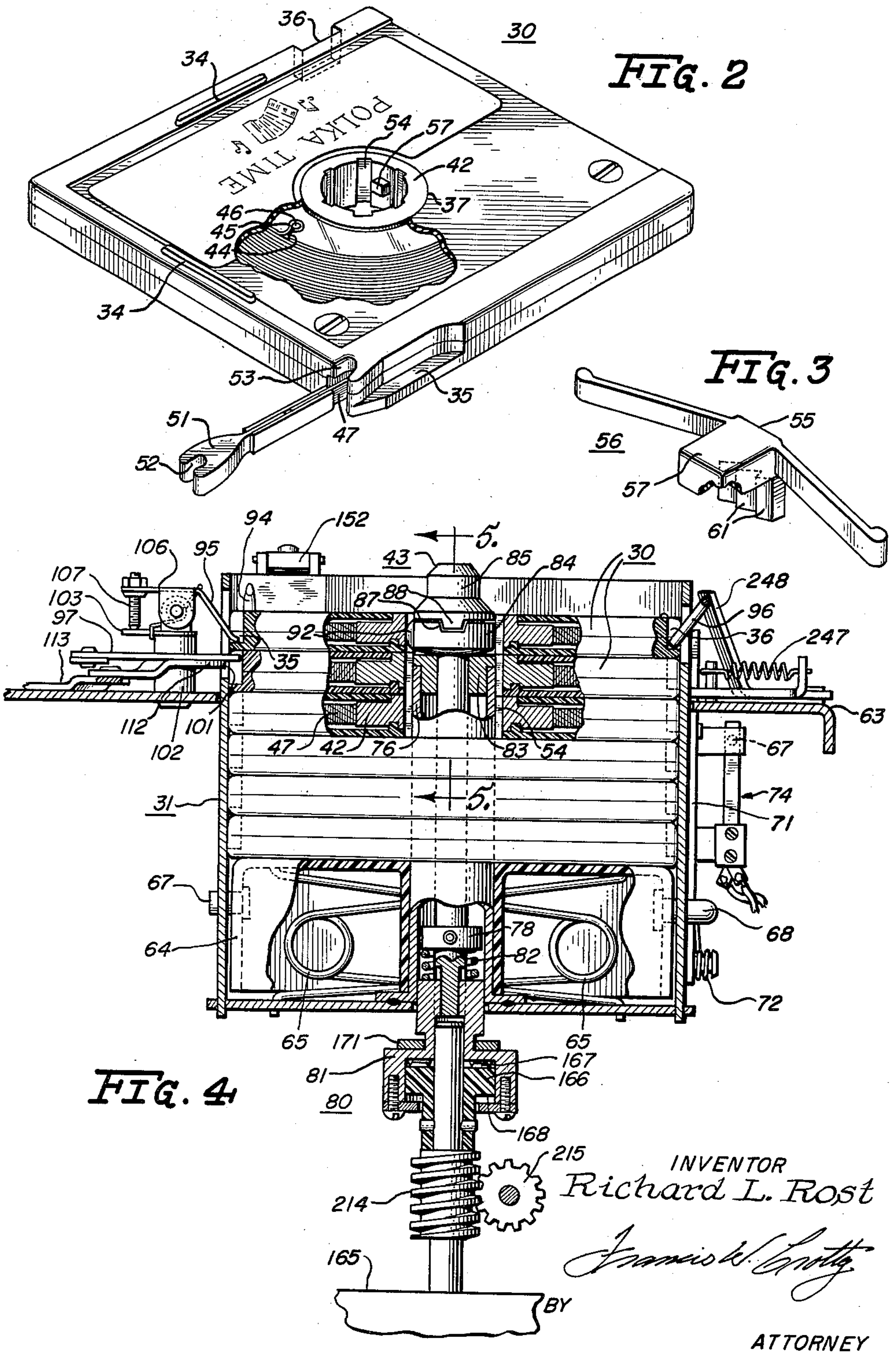
FIGURE 2 is a perspective view of a cartridge of the type preferably employed with the apparatus of FIGURE 1.
FIGURE 3 is a perspective view of a braking device housed within the cartridge of FIGURE 2.
FIGURE 4 is a cross-sectional view taken along lines 4—4 of FIGURE 1.

The tape cartridge 30 may take any of a variety of specifically different configurations, a suitable one being represented in FIGURE 2. In addition to being a vehicle for program tape, the cartridge is to satisfy other important requirements. Since it is contemplated that the machine may accommodate one or a series of cartridges within storage bin 31, the abutting or contiguous surfaces of successive cartridges arranged in a stack should preferably have provisions to facilitate their nesting with respect to one another in a stable stack. It is further desirable that the cartridge be formed to facilitate the sequential feed of a group of cartridges to a playing position within the bin 31 and additionally it is preferred that the cartridge have a brake which precludes the unwinding of the tape when the cartridge is stored.

As represented, the cartridge is formed of a pair of essentially rectangular rigid plates with a peripheral flange of such depth that the plates, superposed with their flanges in meeting engagement, define a cavity to accommodate the desired number of convolutions of a magnetic tape of a specified width. Machine screws may retain the plates in assembled relation. The projection 34 on the top surface of one cartridge face may be received by complementary recesses in the bottom surface of a like cartridge stack on top of that illustrated in order to achieve an interlocking of the cartridges in a stack. The cartridge plates have a formed section at one side to define a shelf 35 which adapts the cartridge to a sequential feed mechanism presently to be considered. For balancing purposes, a generally similar shelf 36 is formed in the diametrically opposite portion of the cartridge. Each of the plates of the cartridge has a centrally located aperture; aperture 37 of one plate is larger than aperture 41 of the other as shown more clearly in FIGURE 5. A hub 42 is interposed between the plates with a reduced diameter section thereof received within aperture 37. The inner diameter of the hub corresponds to the diameter of plate aperture 41 and they collectively define a channelway for accepting a spindle assembly 43, that is, for permitting the cartridge to be threaded over a spindle within the storage bin 31.

The hub 42 is rotatably supported within the cartridge and convolutions of the tape material are coiled thereabout. In order to affix the inner end of the tape, hub 42 has a slot 44 leading to a hole 45. The innermost end of the tape may be inserted through the slot into the hole and locked in place by the insertion of a pin 46. The free end of the magnetic tape 47 terminates in a coupler 51 which appears clearly in FIGURE 2 where, for purposes of illustration, a short section of tape 47 is shown withdrawn from the confines of the cartridge. The coupler has a bifurcated configuration which defines a channelway 52 into which a mating coupler, hereinafter referred to as an extractor, may be inserted to couple tape 47 to a take-up reel. Normally, the tape is completely confined within the cartridge with channelway 52 in alignment with a similar channelway 53 formed in the corner of the cartridge.

As illustrated in FIGURE 2, the inner periphery of hub 42 bears a series of formed slots or keyways 54 which are the means through which a mechanical driving connection may be completed to the hub from a driving spindle.

Figures 5, 6:
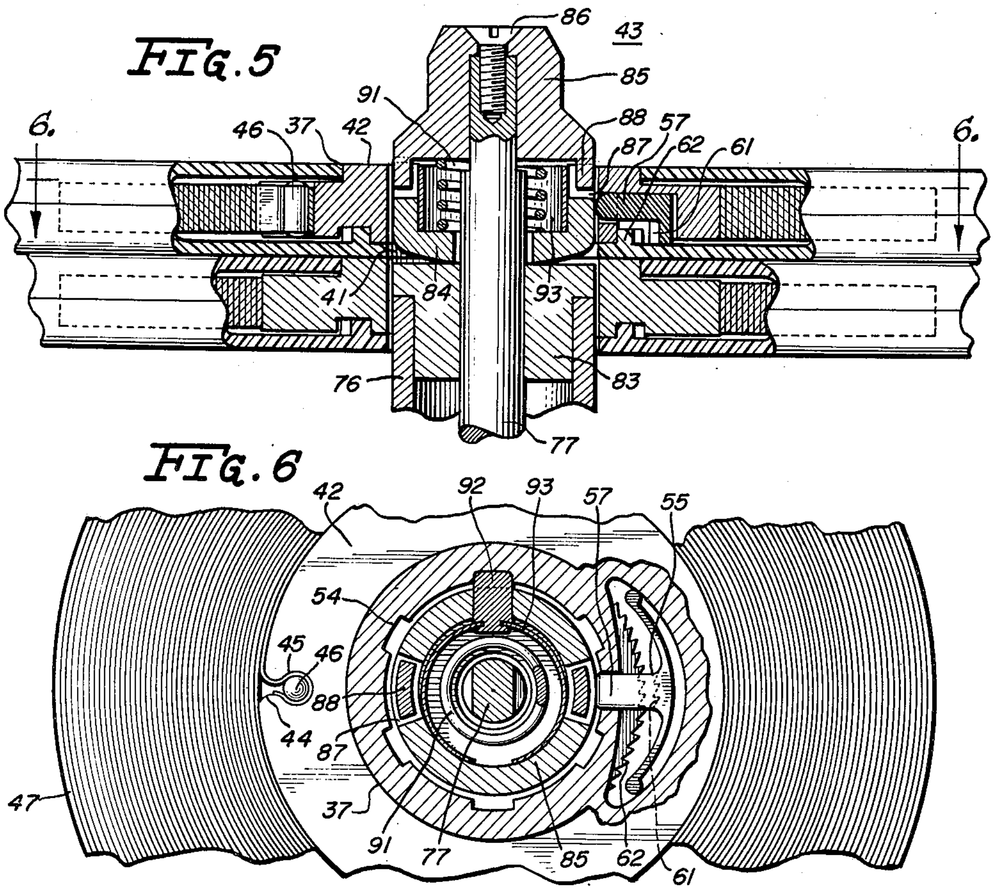
FIGURE 5 is a cross-sectional view taken along lines 5—5 of FIGURE 4.
FIGURE 6 is a partial cross-sectional view taken along lines 6—6 of FIGURE 5.

A braking mechanism is constructed within the cartridge to the end that the wound tape will not release or unwind; the details of the brake are revealed in FIGURES 3, 5 and 6. A portion of hub 42 is relieved or cutaway to accommodate the head 55 of a T-shaped locking element 56 which has a transverse section 57 and a channelway is formed in hub 42 through which section 57 projects as shown in FIGURE 2. A series of teeth 61 are formed in the locking element close to the meeting place of its sections 55 and 57 as shown in FIGURE 3. Element 56 is so held in hub 42 that these teeth normally engage with teeth formed on an inwardly projecting annular surface or flange 62 of one of the cartridge plates to lock the hub against rotation. However, by pushing on portion 57 of locking element 56 these teeth may be disengaged and the hub released. The head portions 55 of the locking element are resilient so that during intervals in which the teeth are released portions 55 urge them back into locking engagement. The locking engagement of the teeth is released when the cartridge is mounted over a spindle such as that contained in storage bin 31. The recess in hub 42 which houses locking element 56 may be provided with a cover plate (not shown) to keep the assembly together.

*Storage Bin*

The storage bin is secured to deck 63 and is a generally rectangular cylinder dimensioned and formed to accept one or more cartridges 30 with the cartridges horizontally disposed as represented in FIGURE 4. The cylinder is open at the top and has a platform 64 disposed opposite that opening. The platform is normally biased in the direction of the open end by springs 65 and recedes toward the bottom of the well as cartridges are loaded into the bin. Opposed sides of the bin have a vertically disposed slot 66 which shows clearly in FIGURE 7 Pins 67 and 68 extend horizontally from depending flange sections of platform 64 and ride in these slots, using them as guides for the platform movement.

Figure 11:
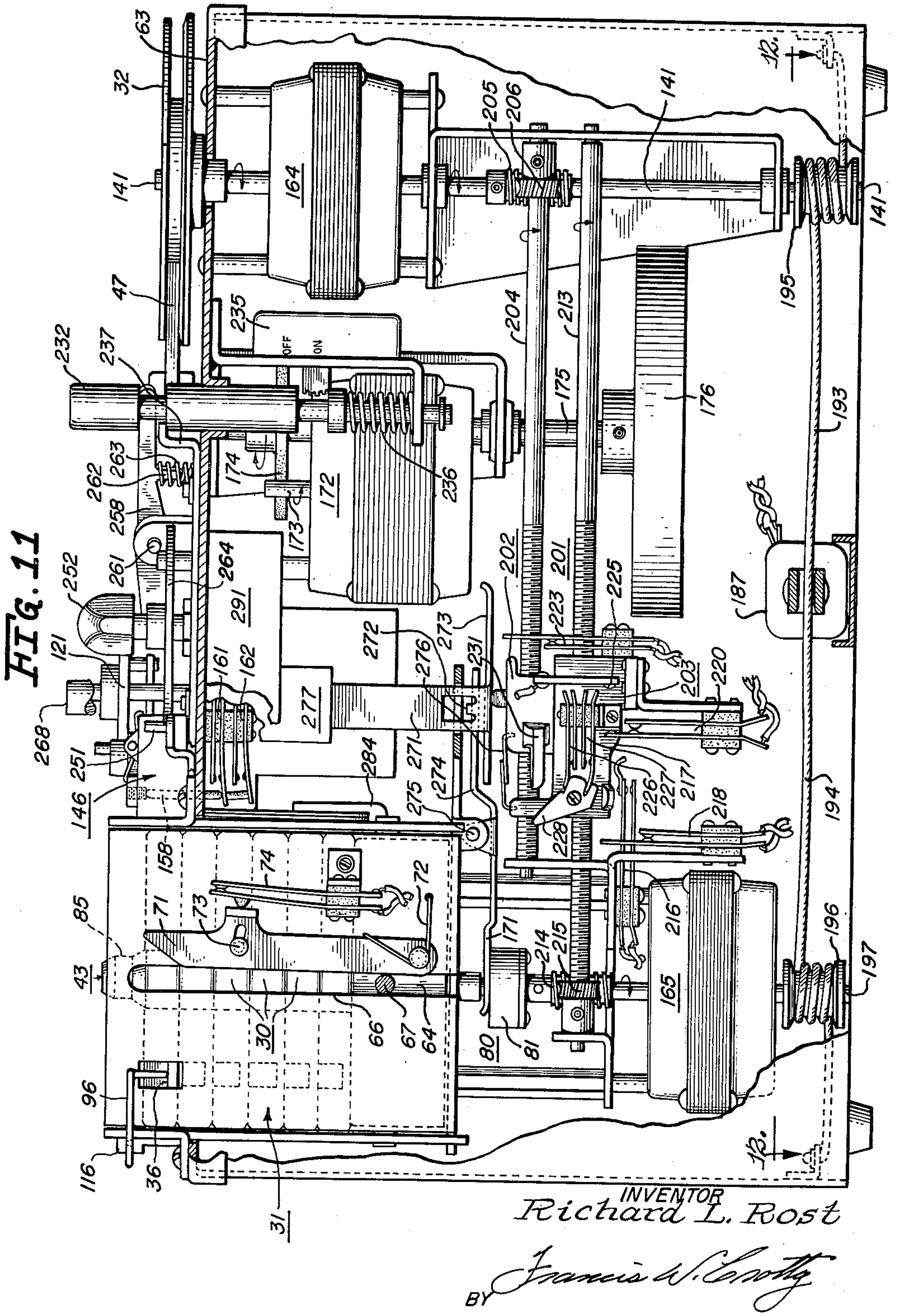
FIGURE 11 is a partial cross-sectional view taken along lines 11—11 of FIGURE 1.

It is appropriate to provide a lock out circuit which prevents the operation of the tape deck in the absence of a cartridge at the playing level within bin 31. For that purpose, a switch operating lever 71 is supported on a side wall of the bin and urged into the path of travel of pin 67 by a spring 72 as shown in FIGURE 11. The switch lever is confined to a limited path of displacement by a pin and slot arrangement 73. A projection of lever 71 may abut an insulating projection affixed to the movable blade of a switch pair 74. The free end of lever 71 is canted to constitute a cam surface in order that the lever may be actuated in accordance with the displacement of pin 67.

When the bin is empty and springs 65 displace platform 64 to its highest position within the bin, pin 67 is positioned adjacent the tapered end of the lever 71 but is out of contact therewith because of the limited displacement permitted of this lever by pin and slot 73. When a single cartridge is inserted into the bin and depressed to the playing level, which causes platform 64 to be depressed a like amount, pin 67 rides over the wide end of the tapered termination of lever 71 displacing it to the position shown in FIGURE 11. This closes contact pair 74 and prepares the transport for operation at least so far as this switch pair is concerned.

The pin 67 operates lever 71 as just described and also displaces a cam lever 75 to accomplish automatic shut off in a manner to be explained hereinafter.

*Spindle Assembly*

In addition to serving as a container for the cartridges, bin 31 accommodates the spindle assembly 43 through which the hub of the cartridge in the playing position may be driven. The spindle assembly has a sleeve portion 76 shown in FIGURES 4 and 5 which extends throughout most of the depth of the bin, passing through a centrally located aperture in platform 64 to permit axial movement of the platform relative to the spindle. Within sleeve 76 is a drive spindle 77 which carries a collar 78 near the bottom of the bin through which is driven clutch member 81 is urged downwardly by a compression spring 82.

Stationary sleeve 76 is terminated at its upper end in a bearing 83 which has a centrally disposed aperture for receiving drive spindle 77. The upper surface of element 83 defines the general location of the playing position of cartridges within the storage bin. Disposed immediately above the bearing surface of element 83 is a collar 84 and a cap 85 is placed over this collar. The cap is connected to the end of drive spindle 77 through a machine screw 86 and its end is tapered to facilitate threading cartridges thereover. The periphery of collar 84 contiguous to end cap 85 has spaced thereover. The periphery of collar 84 continuous to end cap 85 has spaced opposed recesses 87 which receive a pair of depending drive fingers 88 extending downwardly from cap 85. This establishes a mechanical coupling from spindle 77 through cap 85 to collar 84 and slots 87 are slightly wider than drive fingers 88 so that there is a relatively free driving connection between them. The obverse face of collar 84 is curved to rest on the bearing surface of element 83.

With this driving connection, cap 85 rotates collar 84 and at the same time permits movement of the collar about its curved bottom surface in a plane substantially transverse to the rotational axis of the drive spindle which contributes a self-aligning feature and permits the mechanism to accommodate cartridges which may have imperfections that, in the absence of this freedom of transverse motion, would tend to bind and stall the machine. A coil spring 91 interposed within collar 84 and cap 85 urges the collar into coaxial alignment with spindle 77.

Figure 7:
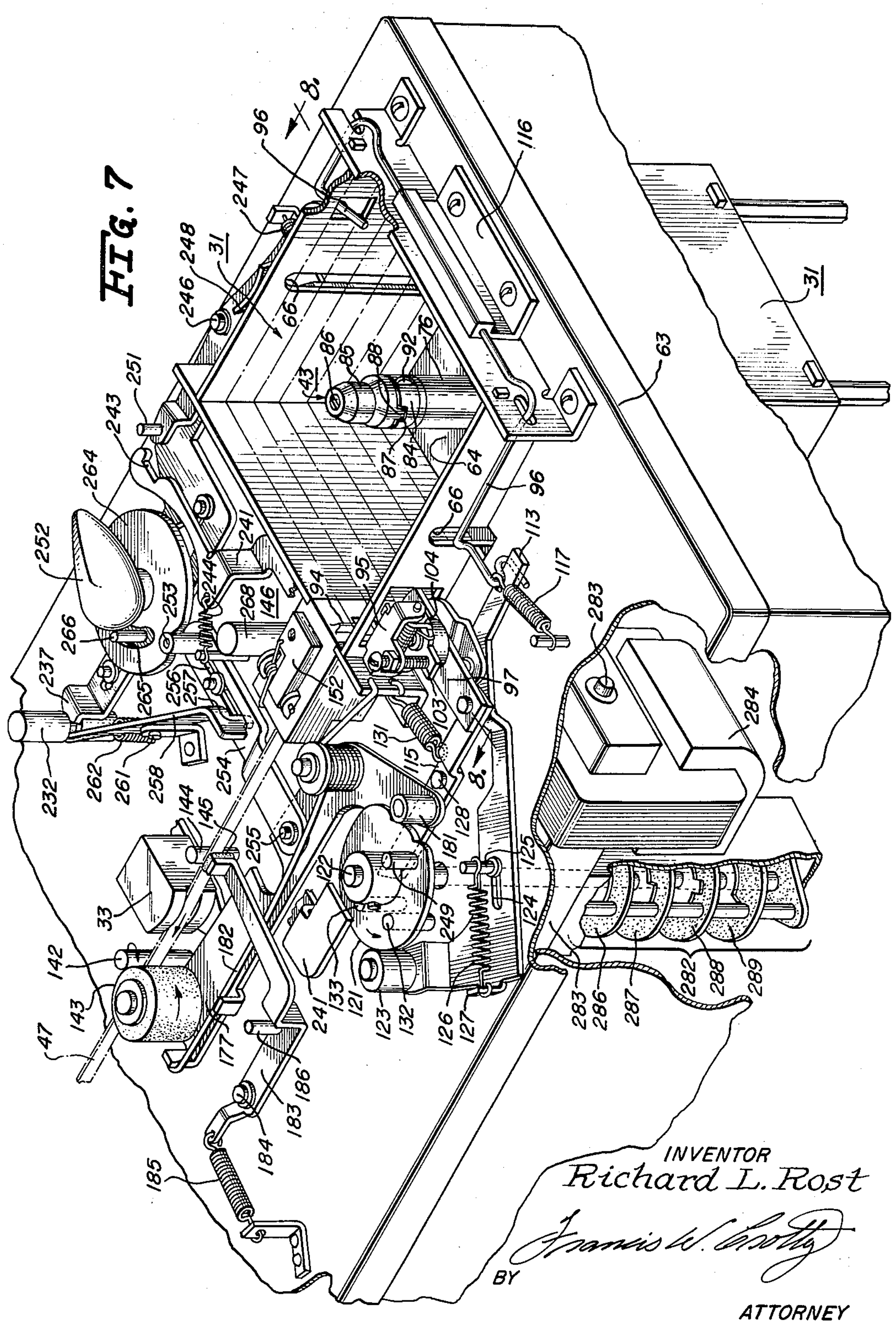
FIGURE 7 is a fragmentary perspective view of the apparatus shown in the plan view of FIGURE 1.

The described driving connection is extended from collar 84 to hub 42 of the cartridge instantaneously in the playing position by means of a pin 92 affixed to the collar and accepted by one of the slots 54 of the cartridge hub as shown in FIGURE 6. If drive pin 92 is not in alignment with a slot in the cartridge hub at the moment the cartridge is fed to the playing position, the pin, which is of crescent shape as shown in FIGURE 7, recedes within collar 84 against the bias of an annular spring 93 upon which the pin is supported. When it is desirable to extend the mechanical driving connection to hub 42 of that particular cartridge, collar 84 rotates until pin 92 comes into alignment with one of the slots 54. At that time, it enters the slot and completes the mechanical connection.

*Bin Loading*

In describing the loading of cartridges into the bin, it will be assumed initially that there are no cartridges therein and that platform 64 is in its uppermost position. The mounting aperture of the first cartridge is slipped over cap 85 of the spindle assembly and pushed downwardly. If the channelway 53 is aligned with a rib 94 projecting into the bin as shown in FIGURE 7, the cartridge may be inserted further by pushing to overcome springs 65. Obviously, the insertion of the cartridge is blocked unless it is properly oriented with respect to rib 94. In the downward movement of the cartridge, the tapered shoulder of cap 85, immediately above driving collar 84, cams locking element 57 radially outwardly to release the locking engagement of its teeth 61 with teeth 62 of the cartridge. Referring to FIGURE 4, as the cartridge is thus forced down over the spindle assembly, elements 95 and 96 which normally rest in the path of the cartridges yield, being deflected outwardly of the path by the passage of the cartridge itself. Once the cartridge has been inserted sufficiently to place shelves 35 and 36 thereof beneath the level of stop abutments 95 and 96, respectively, the downward pressure on the cartridge may be relaxed because the cartridge will now be retained within the bin. It will be retained at the playing level by the influence of platform 64 which urges the cartridge upwardly against the restraining effect of stop abutments 95 and 96 which overlie stop shoulders 35 and 36 once the cartridge has been inserted to a sufficient depth in the bin. A series of cartridges may be loaded in the same manner, stacked one upon another on the spindle assembly until as many as desired have been stored, up to the capacity of the bin. The cartridges will be accepted in the bin only in that orientation which locates their coupler termination 51 properly to achieve a coupling connection with the companion coupler or extractor when any stored cartridge is to be transcribed in a manner to be described hereinafter.

As indicated in FIGURE 4, there is an additional element 97 which may project into the bin to preclude adding cartridges to the supply. It is of course desirable to preclude adding cartridges during the time a particular cartridge is being transcribed. Lever 97 is controlled by a programming arrangement to be described subsequently and rests under shelf 35 of the cartridge instantaneously in the playing position throughout its play. At other times, however, lever 97 is withdrawn so that the feeding of cartridges may take place both into and out of the bin. For example, it is essential the lever 97 be retracted during a cartridge feed cycle and also during load or reject operations as will be made clear.

*Cartridge Sequential Feed*

The sequential presentation of cartridges stored within bin 31 to the playing position thereof involves the retraction of stop abutments 95 and 96 to release the cartridge instantaneously in the playing position and, at the same time, the introduction of a third stop abutment 101 into the feed path of the cartridges so that the stack has restricted movement, limited to advancing substantially only the thickness of one cartridge in each feed cycle. The mechanism for carrying out this process is shown in FIGURE 7 and also in the detail views of FIGURES 8 and 9. Initial consideration will be given to the assembly including stop abutments 95 and 101.

A post assembly 102 is secured to the frame or top plate 63 of the transport mechanism as a support for these stop abutments. At its upper surface it carries a T-shaped member 103 which has upstanding flange portions 104 at opposed ends of what is generally considered the horizontal portion of the T. These flanges are apertured to receive a stub shaft 105 upon which are pivotally supported depending flanges of a stop plate 106. Post assembly 102 is mounted adjacent one side of bin 31 and stop abutment 95 constitutes a forwardly extending projection of member 106 which is normally disposed through an opening in the bin into the feed path of cartridges as clearly illustrated in FIGURE 8. An oppositely directed extension of member 103 accommodates an adjusting screw 107 and a spring 111 coiled about pivot shaft 105 urges stop plate 106 in a counterclockwise direction; its normal resting position is determined by the engagement of threaded pin 107 with member 103. The adjustment of pin 107, in controlling the position of stop abutment 105, restricts the upward movement of cartridges 30 under the influence of the upwardly biased platform 64 and in this fashion locates the cartridge engaged by the stop abutment at the precise level for playing.

Figures 8, 9:
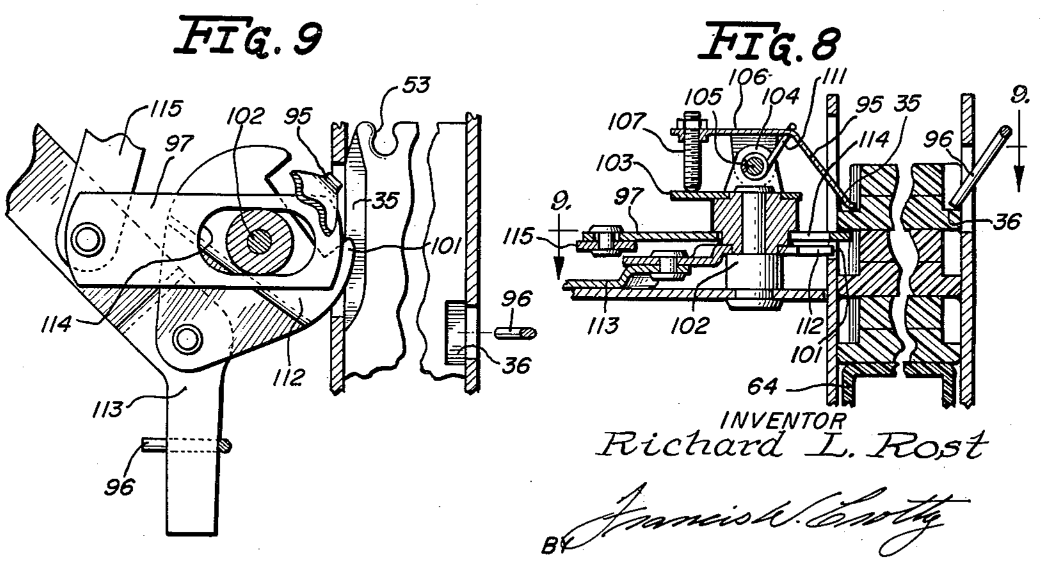
FIGURE 8 is a cross-sectional view taken along lines 8—8 of FIGURE 7.
FIGURE 9 is a cross-sectional view taken along lines 9—9 of FIGURE 8.

Stop abutment 101, as shown most clearly in FIGURE 9, comprises one tine of a bifurcated lever 112 which is affixed to a reduced diameter section of post assembly 102 so that rotation of the lever effects rotation of the post assembly and with it stop abutments 95 and 101. Lever 112 is pivotally connected to a driving lever 113 which may be actuated to oscillate lever 112 and post assembly 102.

The bifurcation in lever 112 which makes room for the free end of abutment 95 which, in loading of cartridges into the bin, is deflected out of the bin and into the plane of lever 112. Of course, if abutment 95 is short enough not to extend into the plane of lever 112, this bifurcation is not required. The location of lever 112 on post assembly 102 is selected to present stop abutment 101 at a level which is above shelf 36 of the cartridge immediately below the cartridge instantly in the playing position within the bin.

Intermediate plate 112 and the uppermost portion of post assembly 102 is the slide plate 97 which extends into bin 31 into the feed path of cartridges, as shown in FIGURE 8, at all times except during a cartridge feeding cycle, cartridge reject or during an index or reference condition in which the machine is established when not in use or when the bin is to be loaded. Slide plate 97 has an elongated slot 114 through which post assembly 102 projects. The slot is dimensioned to permit retraction of slide plate 97 from the feed path of cartridges, as shown in FIGURE 9, under the influence of an actuating lever 115 to which plate 97 is pivotally connected and also to permit post assembly 102 to rotate relative to this plate.

Stop abutment 96 is a companion to abutment 95, extending into the opposite wall of bin 31 and engaging shelf 36 of the cartridge to balance the effect of abutment 95. Abutment 96, as represented most clearly in FIGURE 7, is the return bend portion of generally U-shaped wire or rod which, at its opposite end, has a configuration to assist in effecting a mechanical connection to lever 113 which actuates lever 112, this connection permitting lever 113 concurrently to actuate both abutments 95 and 96. The connection is easily effected by forming a J-shaped termination at the actuated end of rod 96. Preferably, the rod passes freely through an elongated guide 116 supported on the deck of the mechanism and a bias spring 117 urges the rod to introduce the end thereof through an aperture of bin 31.

The timed operation of the pair of abutments 95 and 96 in relation to abutment 101 is accomplished by a cam 121 affixed to the free end of a drive shaft 122 for rotation therewith. As shown in FIGURE 7, actuator 113 has a generally L-shaped configuration with a cam following roller 123 rotatably supported at one end and terminating at its opposite end in an extension engaged by rod 96. Actuator 113 is slotted at 124 and a pin 125 secured to frame 63 projects through this slot. A spring 126 is achored to pin 125 and to a finger 127 of the actuator to urge the actuator generally in the direction of bin 31. Displacement of the pin in that direction, as permitted by slot 124, rotates lever 112 in a counterclockwise direction because of its pivotal engagement with the actuator and concurrently displaces rod 96 to retract its free end from its normal position within the bin.

Actuator 115 of slide plate 97 is pivoted to a pin 128 also extending from frame plate 63. A spring 131 extending between the actuator and a stationary bracket urges the actuator in a counterclockwise direction to introduce the free end of slide plate 97 into the cartridge feed path. Actuator 115 may be rotated in a clockwise direction to retract slide plate 97 from the bin by means of a pair of pins 132 and 133 which depend from the lower surface of cam 121.

At the start of a cartridge change cycle, slide plate 97 and stop abutments 95, 101 and 96 have the relative positions represented in FIGURE 8. As the apparatus enters the cartridge change cycle, cam 121 rotates in a counterclockwise direction and presents pin 132 to lever 115, withdrawing plate 97 from the feed path of the cartridges. Directly thereafter, the low sector of the cam is presented to cam follower 123 which then permits spring 117 to slide actuator 113 in the direction of bin 31. This causes oscillation of post assembly 102, rotating stop abutment 95 out of the feed path of cartridges but introducing stop abutment 101 into that path at a point below the cartridge which has been at the playing level or position in the bin. At the same time, displacement of actuator 113 retracts stop abutment 96 and the complete condition is that represented in FIGURE 9. The uppermost cartridge is now free and is ejected from the playing position while the cartridge immediately thereunder is introduced into the playing position. Continuing rotation of cam 121 restores stop abutments 95 and 96 to their normal positions shown in FIGURE 8 and retracts abutment 101. The pin 132 clears actuator 115, but spring 131 is not permitted to advance slide plate 97 to its normal position extending into the bin because pin 133 is now in engagement with actuator 115. The actuator 115 remains withdrawn after the cartridge feed cycle is completed.

Before leaving this general area of the apparatus, it is appropriate to point out that the actuation of slide plate 97 occurs once in each cycle of cam 121 and the plate remains withdrawn during what may be referred to as the index or reference position and the cartridge change or escape position of the apparatus. It is the index position in which the apparatus stops in response to automatic shut-off to be considered hereinafter and the retraction of slide plate 97 is necessary in order that cartridges may be loaded into the bin as previously explained.

*Take-Up Arrangement*

In order to transcribe a tape established at the playing position within bin 31, a take-up mechanism draws the tape along a path wherein it is presented in magnetic coupling relation to transcribing head 33. This is the requirement for both reproducing a program previously recorded on the tape of the cartridge and for recording a program on a tape fed from the cartridge. For convenience, however, reproducing alone will be considered.

Figures 10, 12, 15:
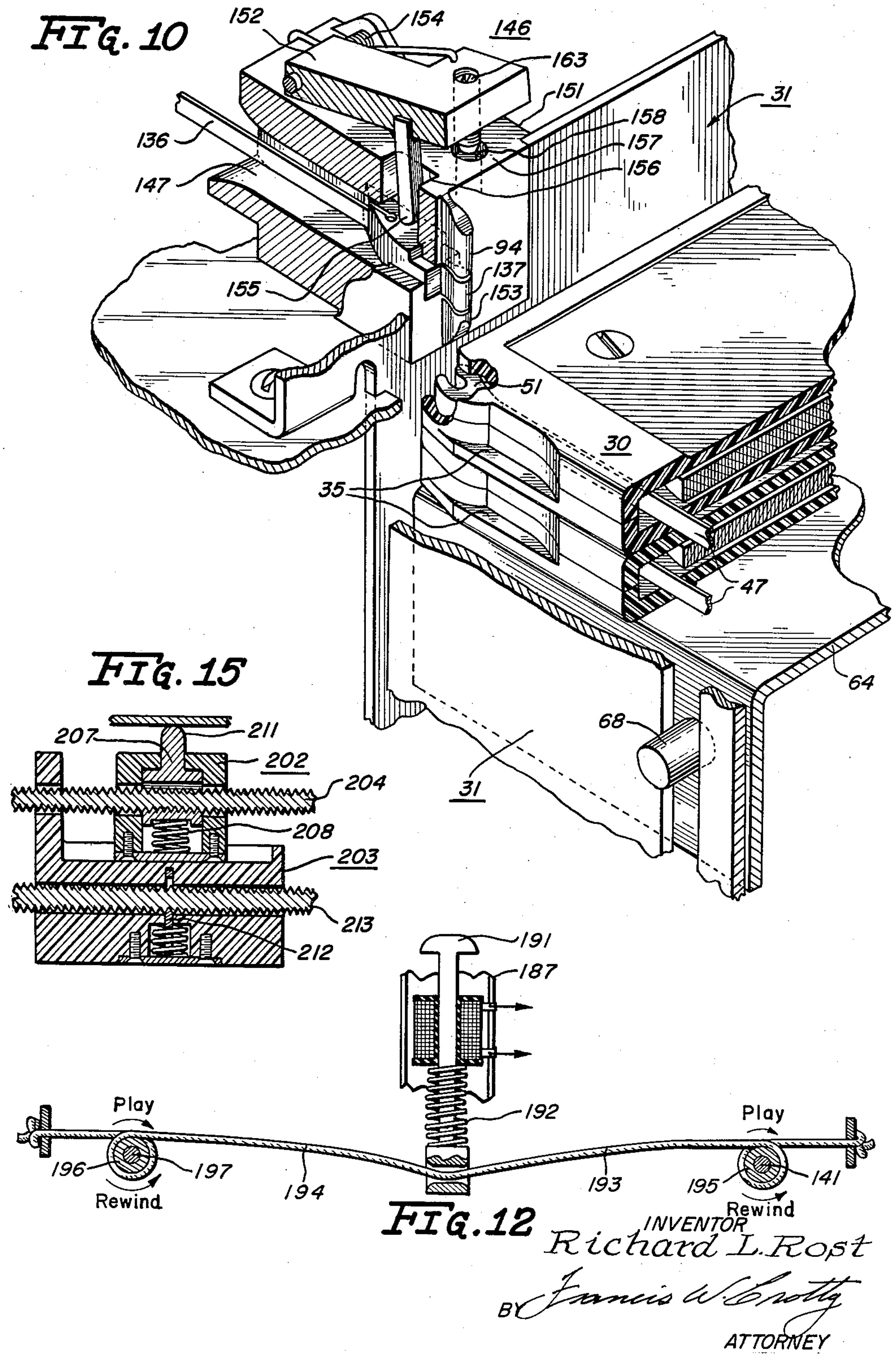
FIGURE 10 is a fragmentary perspective view partly in section of the extractor housing of FIGURE 1 with the extractor positioned therein.
FIGURE 12 is a cross-sectional view taken along lines 12—12 of FIGURE 11.
FIGURE 15 is a cross-sectional view taken along lines 15—15 of FIGURE 14.

The take-up mechanism comprises a reel 32 which has a hub 134 having a flat section 135 as shown in FIGURE 1. A flexible leader 136 is affixed to the hub at one end and terminates at its opposite end in a coupling 137 which has been referred to above as an extractor. The detail view of FIGURE 10 shows that the coupler terminates in a formed section which may slide into the bifurcated coupling termination 51 of tape carried by any cartridge. The flat section 135 of the take-up reel hub is arranged in conjunction with the length of its leader 136 that, as the leader is coiled about hub 134, coupler 137 is disposed at the flattened section of the hub as shown in FIGURE 1. It has been found that this permits winding convolutions of a program tape thereover in a nearly circularly symmetrical pattern.

Take-up reel 32 is mechanically secured to a drive shaft 141 which projects above deck 63 so that the reel may conveniently be rotated or driven. To achieve a mechanical coupling between a cartridge at the playing position within bin 31 and take-up reel 32 the take up leader 136 is passed along a path between a driving capstan 142 and a cooperating pressure roller 143, past a tape groove formed at the terminal portion of a magnetic transducer or head 33 mounted on an adjustably positionable bracket 39, and between a tape guide 144 and cooperating pressure pad 145 leading to a housing 146 secured to deck 63 contiguous to that portion of storage bin 31 where coupler 51 of a cartridge in playing position is accessible as shown more clearly in FIGURE 10. The threading of the tape leader along this path may be accomplished before the instrument is released to the customer. In normal use of the instrument thereafter, the take-up leader 136 remains properly disposed along this path relieving the user from the annoyance of threading which is characteristic of many prior tape decks.

Reference is made to FIGURE 10 which shows the structural details of housing 146. It has a channelway 147 cut out of a block 151 with a flared opening facing take-up reel 32 and leading directly to an aperture in the contiguous side wall of storage bin 31. The level of channel 147 corresponds to the cartridge playing level of bin 31. The channel is dimensioned to freely accept extractor 137 which, in its home or rest position, is disposed at the end of channel 147 projecting into bin 31 in vertical alignment with the position assumed by coupler 51 of a cartridge in the bin.

Obviously, in loading cartridges into the bin as indicated above, the proper orientation of the cartridge permits the coupling termination 51 of the cartridge to slide or thread over the complementary termination of extractor 137 as indicated in FIGURE 10 which shows the position of a cartridge having just passed over extractor 137 during loading. The alignment of extractor 137 with the cartridge couplers 51 assures that sequential positioning of the cartridges at the playing level, as described above, introduces the termination of extractor 137 into complete coupling relation with tape termination 51 to establish a firm coupling connection therebetween. To insure proper alignment between elements 137, 51 a rib 153 and rib 94 are respectively mounted on housing 146 below and above the channel 147. These ribs are positioned to orient the coupler 51 of each cartridge prior to its reaching the playing level.

Entrance of extractor 51 into housing 146 and its assuming its rest position shown in FIGURE 10 is relied upon to time part of the programming of the transport operating cycle. To that end a switch operator is incorporated into housing 146, comprising a plate 152 pivotally supported on the top surface of block 151 and urged in a clockwise direction by a spring 154. A tapered finger 155 depends from the undersurface of the plate, passing through a vertical channel 156 into channel 147 to be displaced therefrom as extractor 137 assumes its rest position. A switch operator or pin 157 fits loosely within a second vertically disposed channel 158 of block 151 and rests loosely upon the movable resilient contact of a double switch pair 161, 162 positioned on the undersurface of deck 63 directly beneath housing 146 as shown in FIGURE 11. The connection between plate 152 and pin 157 is established through a screw 163 threaded through an opening in the plate into alignment with pin 157. Through this construction one may conveniently adjust the actuation of the switch in response to movement of plate 152.

When extractor 137 is in any position other than that shown in FIGURE 10, plate 152 responds to spring 154 and depresses pin 157 to open switch pair 161, 162. However, as extractor 51 assumes the position shown in FIGURE 10, at the end of a rewind operation, plate 152 is displaced in a counterclockwise direction permitting the resilient switch blades of contact pairs 161, 162 to move vertically upward and close circuits which respectively advance the programming cycle and indicate that a portion of the reset operation has been complete as explained hereinafter.

*Driving Mechanism*

As in any winding and reeling apparatus, the tape may be payed off one reel and taken up by the other through the simple expedient of driving that reel which serves at the moment as the take-up reel. Since the apparatus contemplates the use of one take-up reel 32 in conjunction with any of a number of cartridges stored in bin 31, it is necessary to provide a driving mechanism for selectively rotating reel 32 for the play of the cartridge instantaneously at the playing level in the storage bin. Reel 32 is driven by a motor 164 having a driving shaft 141 to which the reel is mechanically coupled through any suitable means. A similar motor 165 may drive the spindle assembly 43 of the storage bin through a clutch 80 which is represented in FIGURE 4. The clutch permits positive drive from motor 165 to the spindle drive shaft 77 or a frictional drive therebetween.

The clutch assembly comprises a driving portion 166 having driving teeth 167 on the surface facing the spindle assembly. The driving element is rubber or other material having a high coefficient of friction. The driven part of the clutch comprises a casing 81 which encloses driver 166 and has on the surface facing the driver complementary teeth through which a positive driving connection may be established between the driving and driven elements. Spring 82 urges these teeth into engagement. The dimensions of driven portion 81 are such as to frictionally engage driving element 166 at its periphery as well as at its face 168 although normally the driving element is positioned, as shown in FIGURE 4, to effect mating engagement of the teeth of the clutch with a separation between surface 168 and the end cap of driven member 81. A pivoted lever 274 having a bifurcated termination 171 engages a reduced diameter section of the driven part of the clutch and may be raised to separate the mating engagement of the teeth in the driving and driven portions of the clutch to have only a frictional engagement of the clutch members. The desirability of converting from positive to friction drive through the clutch will be made clear hereinafter in a discussion of resetting the instrument in the face of breakage of the tape.

The terminal portion of spindle shaft 77 to which driven clutch element 81 is to connect is flattened to be received by a rectangular shaped aperture in the driven clutch portion to assure a solid driving connection therebetween. The same type of connection is employed at the other end of spindle 77 where it connects with cap 85.

Driving of the tape along its path through the selective energization of motors 164 and 165 is appropriate in the initial portion of a transcribing cycle, for search purposes and also for rewind, but it is desired that a more refinely controlled drive be established for the tape during transcription and that is the function of capstan 142 and its companion roller 143. Capstan 142 is driven by an induction motor 172 which appears in FIGURE 11. The driving shaft 173 of the motor engages an idler wheel 174 secured to the capstan shaft 175. The end of that shaft remote from the capstan carries a fly wheel 176 for the purpose of minimizing wow and flutter attributable to short term variations in the speed of motor 172.

Driving engagement of the tape with capstan 142 is accomplished by pressure roller 143 rotatably supported on a bell crank 177 which is pivoted on a post 178 projecting from deck 63 as shown in FIGURE 1. Since it is desirable to have selective drive of the tape through the agency of capstan 142, this bell crank carries a roller 181 functioning as a follower of cam 121. A spring 182 anchored at one end to the frame of the tape deck and also anchored to the end of the bell crank which carries pressure roller 143 biases bell crank 177 in a clockwise direction. During operating intervals in which the large radius section of cam 121 bears against roller 181, roller 143 is free of the tape and the capstan has no driving effect but when the low radial section of the cam is presented to the roller, as illustrated in FIGURE 1, the bell crank yields to the bias of spring 182 and applies pressure roller 143 against the tape to render capstan 142 effective to feed the tape from a cartridge at the playing position in bin 31 to take-up reel 32.

It is most desirable that there be efficient magnetic coupling between the tape and transcribing head 33 and this results from having a well-defined path of travel of the tape past the head. The path is defined by the capstan and pressure roller on one side of the transcribing head and guide 144 and pressure pad 145 at the opposite side. Since coupling of the head to the tape is of importance essentially only during intervals in which the tape is subject to the driving effect of capstan 142, it is arranged that pressure pad 145 assumes its operating position only when pressure roller 143 is effective.

Pad 145 is supported on a bell crank 183 pivoted to a post 184 supported on the deck and urged by a spring 185 toward guide 144. A pin 186 on the bell crank lays over bell crank 177. Accordingly, when bell crank 177 is displaced by cam 121 to withdraw pressure roller 143, lever 177 engages pin 186 to concurrently relieve pressure pad 145 by displacing it from the tape path.

A braking mechanism shown in FIGURES 11 and 12 is provided as a safety feature to prevent tape from spilling, that is to say being fed out in an uncontrolled fashion, in the event that power to the apparatus is interrupted during the normal play or rewind operation of the tape deck. The brake arrangement includes a solenoid 187 having a core 191 movable in a particular direction when the solenoid is energized. A coil spring 192 within the solenoid biases the core in the opposite direction. One end of the core is affixed to the ends of a pair of cables 193 and 194. Several convolutions of brake cable 193 are wound about a pulley 195 at the end of drive shaft 141 of motor 164 and the free end of that cable is anchored to the frame of the machine. In similar fashion, cable 194 makes several turns about a pulley 196 on the end of drive shaft 197 of motor 165 end is then anchored to the frame of the machine.

During normal operation of the machine, solenoid 187 is energized and its core 191 moves to a position such that the convolutions of brake cables 193, 194 are loosened about their respective pulleys 195 and 196. In other words, the brake is not applied and there is no unnecessary load placed on the driving system of the reels. If the power should be interrupted, the solenoid becomes de-energized and spring 192 moves core 191 to a position which applies tension to cables 193 and 194. This places a strong braking force on the one of the two motors which is being in effect driven at that particular instant.

For example, if it be assumed that the tape is being played out of a cartridge and being wound on take-up reel 32, the cartridge hub is in effect a driven member which rotates in a clockwise direction along with pulley 196. De-energization of the solenoid in conjunction with the rotation of brake pulley 196 causes cable 194 to tighten sharply against brake pulley 196 and stop further rotation of the hub of the supply cartridge. When the hub stops rotation, the tape can no longer be payed out and therefore the movement of the take-up mechanism is likewise brought to a halt.

Conversely, if the machine should be in rewind at the time of a power failure, pulley 195 will be rotating in a counterclockwise direction. The movement of core 191 downward under the influence of spring 192 in conjunction with the rotation of pulley 195 sharply tightens brake cable 193 around pulley 195 to arrest further rotation of take-up reel 32.

The driven shaft in each case rotates in a particular direction and the brake cable is wound about the pulley on that shaft in the same direction. The brake cables are affixed to the solenoid core 191 so that the influence of spring 192 on the core tightens the cable on the pulley of the driven shaft. If this condition is satisfied, a power failure causes the driven pulley to pull against the anchored end of its brake cable which tends quickly to stop further rotation. This condition is established with the cable wound in the direction indicated in FIGURE 11 for both the play and rewind operations.

*Sensing System*

Inasmuch as the tape deck is a fully automatic instrument having complex functions to be performed in proper relation to one another, it is necessary to provide a programming arrangement to time the sequence of functions to be accomplished in any operating cycle. For that reason the instrument includes a sensing mechanism that is both reliable and accurate in its operation. It is designated as 201 and is illustrated in FIGURES 11, 13–15, inclusive. The sensing system employs the principle that when a tape has been completely played, take-up reel 32 must have executed the same number of revolutions as the hub of the cartridge from which the tape has been payed out, irrespective of the length of the tape. The mechanism to be described has the attractive attribute that its function is dependent on the turns or revolutions of the reels and is independent of the thickness of the tape.

The sensing system comprises a pair of carriages 202 and 203 and a family of contact pairs which operate in accordance with the relative positions of these carriages. Their relative position is controlled by the cartridge from which the tape issues and by the take-up reel.

Carriage 202 is supported on a threaded shaft 204 which is directly driven through a pair of gears 205 and 206 from drive shaft 141 of take-up reel 32. A partially threaded block 207 is mounted within the housing of carriage 202 and is apertured so that shaft 204 may pass therethrough. A spring 208 biases the block upwardly in order that it may engage the threads of shaft 204 to the end that rotation of the shaft effects longitudinal movement of the carriage in a direction determined by the direction of rotation of the shaft. A finger 211, in the form of an extension of plate 207, projects through an opening in carriage 202 for a reason to be made clear hereafter.

In like fashion, carriage 203 accommodates a thin plate 212 through which a shaft 213 extends, this shaft being driven from the driving shaft of motor 165 through mating gears 214 and 215. A spring urges plate 212 into engagement with the threads of shaft 213 so that carriage 203 may be displaced by rotation of this shaft.

The described coupling of each shaft 214 and 215 to the carriages 202 and 203, respectively, may yield so that either shaft is permitted to rotate even though the carriage which it drives may have achieved the limit of its travel.

Figure 16:
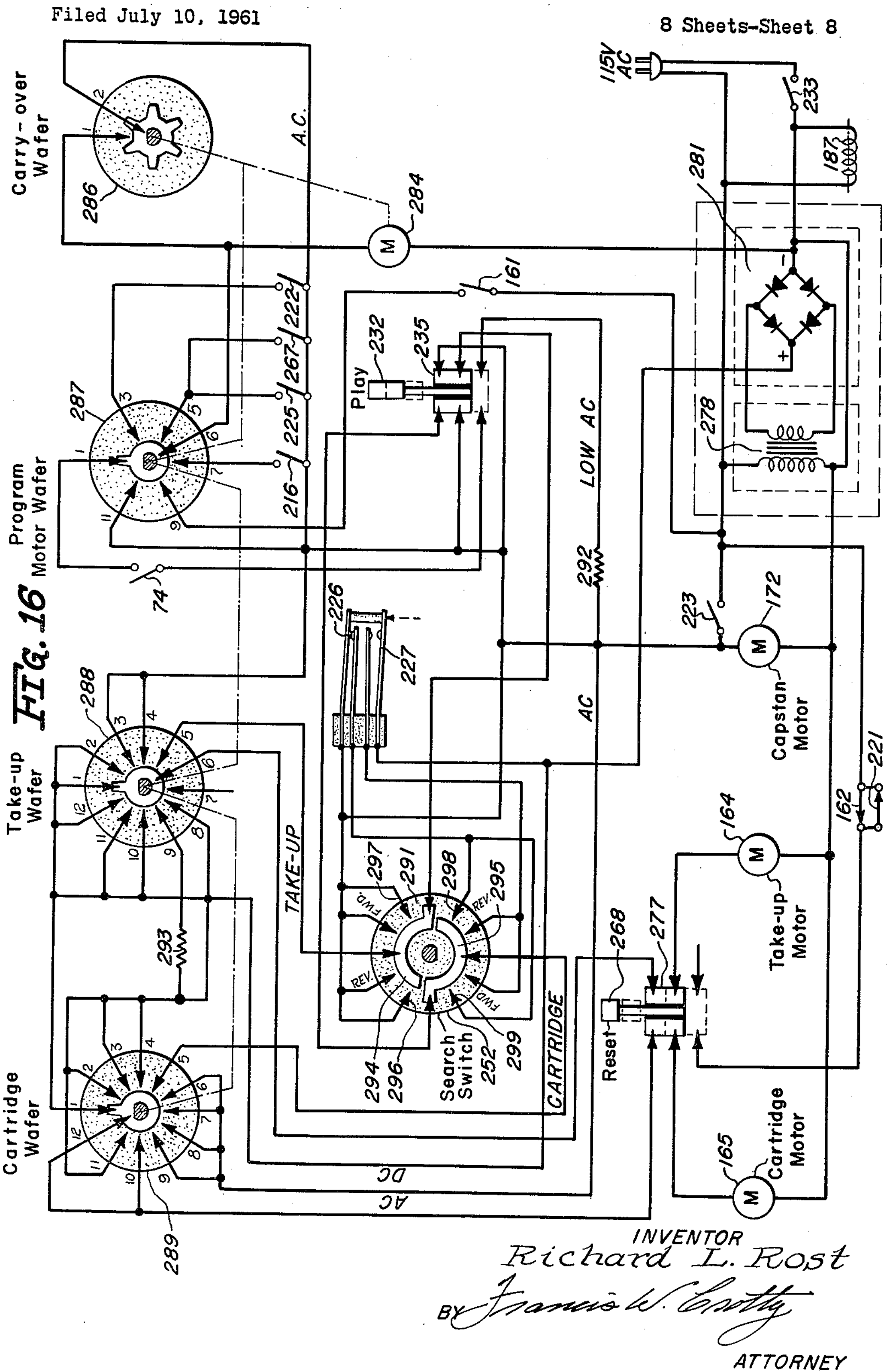
FIGURE 16 is a schematic diagram of the circuitry of the instrument except for the signal reproducing system which is connected to the transcribing head.

The contact pairs to be operated in response to movement of carriages 202 and 203 include a pair 216 supported from the frame of the instrument and positioned to be engaged and operated by a cam surface 217 formed on the lower portion of carriage 203. The frame similarly supports contact pair 218 which is positioned to be engaged and actuated by a finger 221 projecting from the side of housing 203. Carriage 203 itself supports a contact pair 222 and a contact pair 223 the latter of which may be actuated from projection 224 of carriage 202 when the two carriages have certain relative positions. A further contact pair 225 has as one element an extension of a blade of switch 222 supported on carriage 203 and, as its other element, a switch member secured to carriage 202. The closing of contact pair 225 simultaneously causes the opening of switch 222. A double contact pair 226 and 227 are also positioned on carriage 203 and are actuated by a lever 228 which is pivotally mounted to carriage 203. Lever 228 in turn is rotated by a finger 231 which is mounted on carriage 202. Contact pairs 226, 227, lever 228 and finger 231 cooperate to provide a safety device when the search control is activated and the carriages reach their permissible limits of travel. The circuits connected to the several switches are represented in FIGURE 16 and will be described subsequently; suffice it here to consider only the operation of the contact pairs with the function resulting from their actuation.

The operation of the sensing system will be described with reference to FIGURES 13*a*, *b* and *c*. The condition represented in FIGURE 13*a* may be thought of as the starting condition, that is to say, it illustrates the relative positions of carriages 202 and 203 when a cartridge 30 is in position at the playing level within bin 31 and is mechanically connected with take-up reel 32 through the coupling engagement of cartridge termination 51 and extractor 137 within housing 146. Contact pairs 225, 216 and 223 are closed but contact pairs 222 and 218 are open.

When the instrument is turned on by actuation of a start or play button 232, motor 164 is energized and drives take-up reel 32. Motor 165 is de-energized and the cartridge constitutes a load on the take-up system. While the hubs of take-up reel 32 and the tape supply cartridges 30 have the same diameters, reel 32 initially rotates rapidly compared with the reel of cartridge 30 which, at this juncture, bears all of the program tape and therefore has a much larger effective diameter. As a consequence, shaft 204 is driven much faster than shaft 213 and carriage 202 moves to the right along its shaft more quickly than the movement of carriage 203 in the same direction along its shaft.

After an initial winding step, in which extractor 51 is drawn from housing 146 past capstan 142 and its pressure roller 143, carriage 202 will have advanced sufficiently from carriage 203 to first open contact pair 225 and then permit contact pair 222 to close. This is shown in FIGURE 13*b* where it is also apparent that switch pair 218 has closed while switch pair 216 has opened but these switch pairs are not effective in this part of the cycle.

Closure of switch pair 222 results in the actuation of cam 121 through which capstan 142 is brought into driving engagement with the program tape to control the feed of the tape thereafter from cartridge 30 to take-up reel 32. This is known as the play mode whereas the first described condition may be referred to as the start mode. During the play mode, even though the tape feed is controlled by capstan 142, motor 164 remains sufficiently energized to drive take-up reel 32 and accept the tape as it is fed by the capstan.

While take-up reel 32 and shaft 204 initially rotate rapidly relative to the hub of cartridge 30 and shaft 213, their speed differential decreases during the play of the cartridge tape because the effective diameter of the hub of the take-up reel increases with each convolution of the tape wound thereon. When the reels have the same effective diameter, shafts 204 and 213 rotate at the same speed and for this transient condition there is no relative movement of carriages 202 and 203. Immediately thereafter, however, the take-up reel obtains the larger effective diameter and shaft 213 commences to rotate more rapidly than shaft 204. Near the end of the transcription the relative speeds of shafts 204 and 213 will have been reversed from their initial conditions and carriage 203 will have started its movement to the right at a faster rate than carriage 202; it will have commenced to overtake the latter and when the take-up reel has made exactly the same number of turns as the hub of the cartridge wheel, switch 225 will have been closed as indicated in FIGURE 13*c*. Closure of this contact pair effects further incremental displacement of cam 121 raising roller 143 to disable the capstan drive, raising pressure pad 145 and initiating the rewind portion of the cycle by energizing motor 165 and de-energizing or, if desired, effecting a braking action with motor 164. During rewind, carriages 202 and 203 move to the left and return to the initial position of FIGURE 13*a*.

When all but a few turns of tape have been rewound onto cartridge 30, carriage 203 in approaching the position of FIGURE 13*a* causes its cam section 217 to close contact pair 216. Closure of these contacts causes a further incremental displacement of cam 121 and establishes a slow rewind. In other words, the rewind is carried out for most of the tape at a very high speed but when contact pair 216 is closed, the rewind continues at a very much reduced speed to prevent coupler 137 and extractor 51 from damaging the cartridge and housing 146 as they return to the starting position.

As explained above in describing the take-up mechanism, homing of extractor 137 within housing 146 permits switch operator 157 to close contact pair 161 to initiate rotation of cam 121 and execute the aforedescribed cartridge change cycle. The rotation of cam 121 continues, so long as there remains a cartridge in bin 31 to be played, and places the instrument back in its start position so that the cycle may be repeated. After the last cartridge in the bin has been played and been rewound, the cartridge change cycle is interrupted and an automatic shut off is accomplished in the manner to be described subsequently.

*Overall Operation*

To operate the tape deck, one or more cartridges are loaded into bin 31. Their loading orients each cartridge so that the one which is instantaneously at the playing position is in mechanical coupling engagement with the take-up arrangement as required for transcription. To start a transcription, the on-off switch 233 is adjusted to its "on" position and play button 232 is depressed. This places the instrument in its start mode in which take-up reel 32 is driven to present the program tape to the transcribing head 33. After the coupling element 137 and 51 have cleared capstan 142 and its pressure roller 143, the drive is transferred through the influence of programming cam 121 to the capstan 142. At this time the instrument is in its play mode as shown in FIGURE 1 and indicated by arrow 234 positioned adjacent cam 121 and the tape is transcribed. When the tape has been fully transcribed, programming cam 121 in conjunction with associated electrical circuitry explained more fully hereinafter places the instrument in its rewind condition and the tape is rewound into the cartridge at a very fast rate. Near the completion of the rewind function, cam 121 and its associated switch circuitry initiates a slow rewind for the final part of that function. When this function has been completed, cam 121 rotates to actuate the cartridge feed mechanism 38 and to re-establish the start conditions so that the next cartridge contained in the bin may be played.

This process is repeated until every cartridge contained in bin 31 has been transcribed. As each cartridge is moved into the playing position within the bin, it is automatically coupled to the take-up mechanism because of the alignment of its coupling termination 51 with extractor 137 when the latter is in its home position within housing 146 where it is returned after the completion of each transcription. After the play of the final cartridge, the machine enters its automatic shut-off condition.

*Automatic Shut-Off*

While it is desirable automatically to shut off the transport mechanism after the final cartridge stored in bin 31 has been played in order to describe the shut-off mechanism, it is necessary first to understand a lock up linkage associated with play button 232.

Play button 232 is a push button actuator for a switch 235 mounted to the frame of the deck as shown in FIGURE 11. The push button is supported for vertical displacement and is urged upwardly by a spring 236. A locking plate 237, which is slidably supported on the top surface of deck 63 as seen in FIGURE 1, is urged toward switch actuator 232 by a spring 238. As the play button 232 is depressed, lock plate 237 slides over a shoulder portion thereof and locks the switch in its operated position as indicated in FIGURE 11. To accomplish automatic shut-off, it is necessary to slide plate 237 to the left, as viewed in FIGURES 1 and 11, which permits spring 236 to return play button 232 to its "off" position. The mechanism for achieving this shut-off will now be considered.

A bell crank 241 is pivotally mounted on the top surface of deck 63 by a pin 242 and has a cam following termination which may be displaced by a pin 249 positioned on programming cam 121. At its opposite extremity, this lever has a hook shaped termination 243 and the lever is normally biased in a counterclockwise direction by a spring 244 but its displacement in that direction is limited by a stop 245.

Cooperating with lever 241 is a pivoted lever 75 supported on a pivot pin 246 and biased in the direction of bin 31 by a spring 247. Its movement in that direction is limited by engagement of one end of lever 75 with the side of the bin. Intermediate this termination of lever 75 and pivot 246 is a cam surface 248 disposed in the path of pin 68 which extends from platform 64 within the bin. At its opposite end, lever 75 carries an upstanding pin 251 which may be engaged by the hook termination 243 of lever 241 although, under normal circumstances, their relative position is such that they do not engage one another.

So long as cartridges are stored in bin 31 to be played by the machine, the operating cycle proceeds as described above and in each such cycle the cartridge feed mechanism 38 is actuated to advance another cartridge into the playing position. In the cartridge feed cycle immediately succeeding the play of the lowermost cartridge in the bin, pin 68 abuts cam surface 248 and rotates pin 75 against the influence of spring 247, moving the lever in a counterclockwise direction. Immediately thereafter, the pin 249 of programming cam 121 engages and displaces lever 241 in a clockwise direction about its pin 242. This displacement of lever 241 occurs after each cartridge feed cycle and displaces hook 243 in a direction to engage pin 251. Their engagement is only possible, however, after lever 75 has been actuated by pin 68 moving lever 75 to the dotted line position shown in FIGURE 1 and introducing its pin 251 into the path of movement of the hook 243. Engagement of this hook with pin 251 permits lever 241 to displace slide plate 237 to the left as viewed in FIGURE 1, releasing switch button 232 so that its spring 236 may return the button to its "off" position and shut off the machine at least so far as its programming circuitry is concerned.

*Search*

The machine, by preference, employs a tape adapted for a relatively slow transcription speed. For example, it has been proposed that the tape be driven at the speed of 1⅞ i.p.s. as distinguished from the 3¾ i.p.s. speed of other known devices. The advantages of the slower tape speed are obvious in reducing the size of the cartridge for a given playing time. Where the machine does employ a slow transport speed, however, the user benefits from a search feature which permits the tape to be moved rapidly in either direction to locate some particular part of the program material contained thereon. Such a feature has been provided in the apparatus represented in the drawings.

The search control 252 is shown in FIGURES 1 and 7. It is a generally heart-shaped cam mounted for rotation on a post extending from deck 63. A cam following roller 253 is presented to this cam and is carried on a slide plate 254. The free end of the slide plate supports a pin 255 which couples the slide plate to bell crank 177. When slide plate 259 is moved in the direction of cam 121, bell crank 177 is rotated against the action of spring 182. This removes both pressure roller 143 and pressure pad 145 from their operative positions. This is desirable because the search takes place at a speed much faster than that attained through capstan 142 and therefore the capstan drive is disabled during searching. Intermediate its ends, slide plate 254 has a slot 256 which may receive a pin 257 depending downwardly from a lever 258 pivoted to a post 261 on the deck. The opposite end of lever 258 overlies an enlarged portion of the shaft which terminates in play button 232 to permit pin 257 to lock with slot 256 in response to the releasing of play button 232 when the search control is rotated. A spring 262 encloses a depending projection 263 of lever 258 and urges the lever in a counterclockwise direction about its pivot. The slot and pin arrangement is shown more clearly in FIGURE 7.

It is appropriate to release play button 232 during any operating interval in which the search control is to be effective and accordingly cam 264 has a cut-away cam section 265 against which rides a cam following roller 266 which projects upwardly from slide plate 237.

The normal position of search control 252 is that represented in FIGURE 1. Roller 266 here engages the central portion of cam track 265 and interferes in no way with the described operation of play button 232 in turning the transport mechanism on and off. After the mechanism has been turned on by depressing play button 232, the search control may take over by rotating the control clockwise and counterclockwise depending upon the desire to search in a forward or backward direction on the tape. Displacement of the search control from the position shown results in cam section 265 displacing slide plate 237 by its influence upon cam following roller 266. This releases the locking plate from push button 232 and causes the push button to return to its off position.

Concurrently, a high portion of cam 264 is presented to cam follower 253 to displace slide bar 254 in the direction of program cam 121. This causes pressure roller 143 and pressure pad 145 to be moved away from the tape in order that the tape may pass freely along its path without any interference from the capstan or the guide 142, 144. The pressure roller 143 and pressure pad 145 are retained in this position because the movement of the slide bar which displaced these elements resulted in pin 261 dropping into locking engagement with slot 256 of the slide bar, being helped in this movement by the effect of the spring 262 which pivots lever 258 about its pivot 261.

Moreover, at the same time play button 232 is released and pressure roller 143 is removed from its operative position, a high speed energizing circuit is completed selectively to reel motors 164 or 165 depending upon the direction of search that is desired. After the tape has been wound to present a preselected portion to the transcribing head 33, search control 252 is returned to its normal position represented in FIGURE 1. The machine is now in a quiescent condition and the tape may be transcribed by depressing play button 232. The button engages lever 258 and rotates it in a clockwise direction to release the locking engagement of pin 257 and slot 256. Also, slide plate 237 returns to its locking engagement to hold the play button in its "on" position and transcription then proceeds in the normal way.

*Reject*

During the play of any given tape, the user may elect to discontinue the transcription and reject that particular cartridge from the playing position within bin 31. This is accomplished by a reject button 267 which appears in FIGURE 1. When the reject button is depressed, a circuit is completed which is essentially the same as that which initiates rewind after a tape has been completely transcribed. It puts the apparatus into rewind in which the tape is rewound upon its cartridge and then ejected in the usual manner of the cartridge change cycle.

*Reset Mechanism*

Provision is made both to interrupt the normal playing cycle of the instrument and to permit its being properly reset in the event that a tape should break during transcription. If the tape should break while take-up reel 32 is being driven, carriage 202 will continue its movement toward the take-up reel but movement of carriage 203 will stop. As the carriage separation exceeds the normal permissible amount, actuator 224 of carriage 202 opens normally closed contact pair 223 supported by carriage 203. This de-energizes the tape deck and interrupts its normal cycle. After the tape has been repaired or spliced, it is necessary to reset carriages 202 and 203 to their normal relative positions before starting the instrument anew on its operating cycle. This is the function of the reset mechanism.

Figures 13, 14:
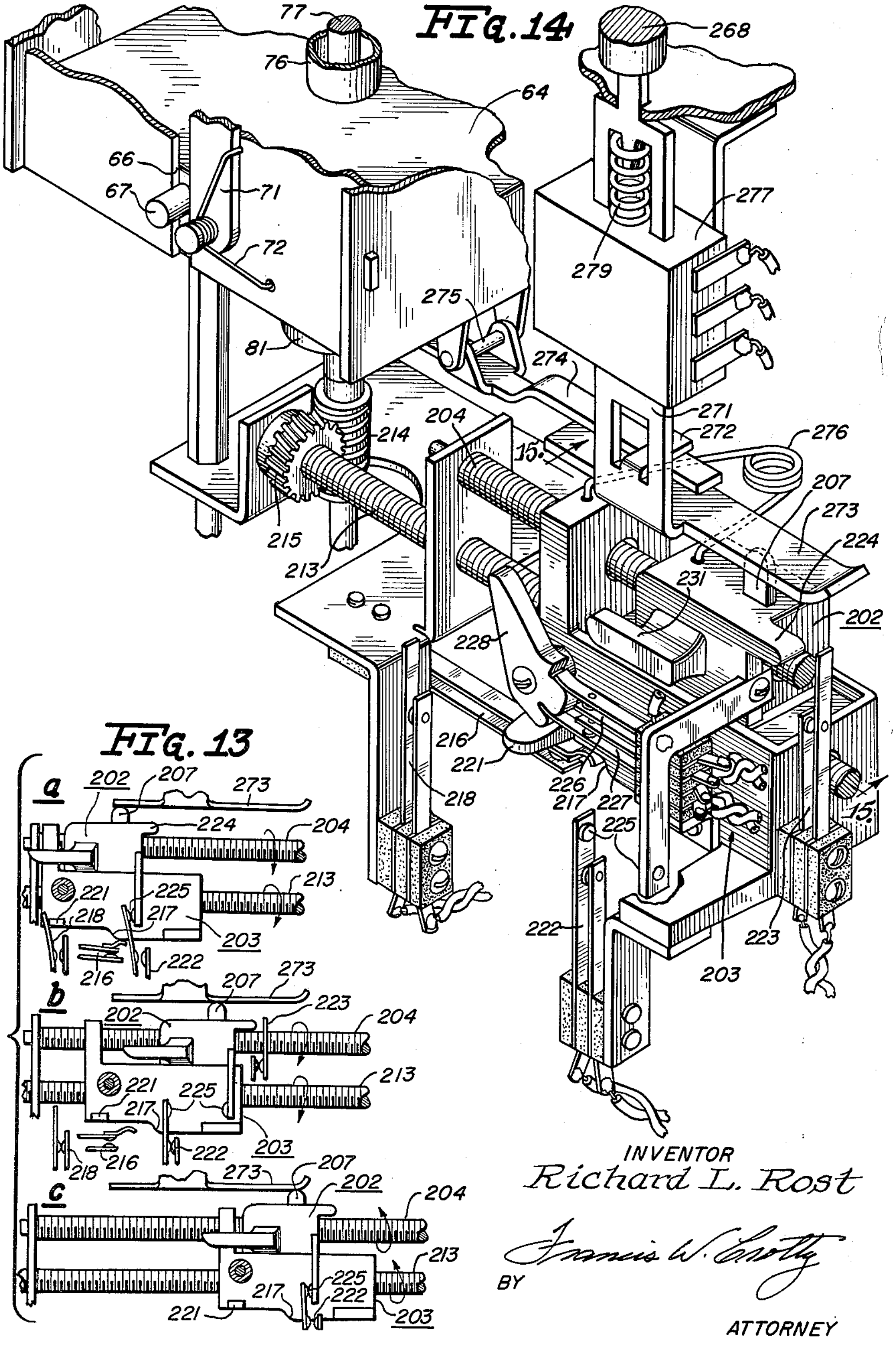
FIGURE 13 shows three typical positions of a portion of the sensing mechanism shown in FIGURE 11.
FIGURE 14 is a fragmentary perspective view of the reset and sensing mechanism of FIGURE 11.

As represented in FIGURE 14, there is a reset button 268 accessible on the top of deck 32 in the region between lever 241 and search control 252. It is in effect a switch operator which controls the reset circuitry by actuation of a switch 277. A spring 279 normally biases the reset button to its switch-open position. The switch operator has a depending portion 271 with a struck out member 272 and terminates in a horizontally disposed shoe 273 positioned in parallel relation to shaft 204. Normally, shoe 273 is clear of carriage 202 and its extending projection 207 but when reset 268 has been depressed, the shoe is lowered to engage projection 207 and depress it against the urging of springs 208, shown in FIGURE 15, with the end result of interrupting the mechanical coupling between carriage 202 and shaft 204. Projection 272 of the reset overlies a lever 274 which pivots about a shaft 275. The opposite end of the lever has a bifurcated termination 171 that is received in a reduced diameter portion of driven clutch element 81 of FIGURE 4 as previously explained. Rotation of clutch lever 274 about its pivot shaft in response to actuation of reset 268 separates the normally mating teeth of the driver and driven portions of clutch 80 so that these clutch elements have then only a frictional engagement. Finally, a hairpin type spring 276 is bridged between carriages 202 and 203 and tends to urge them together. To facilitate mounting this spring in a horizontal plane, carriage 203 may have a vertical extension suitably apertured so that shaft 204 may freely rotate therein as indicated in FIGURE 15.

To accomplish reset, reset button 268 is depressed and is held actuated. As a consequence, clutch lever 274 is displaced to convert the drive of the hub of the cartridge instantaneously in the playing position of bin 31 from positive to a friction drive. Also, shoe 273 releases the coupling of housing 202 to shaft 204, permitting spring 276 to displace housing 202 toward the vertical extension of housing 203. At the same time, switch 277 is operated and motor 165 alone is energized. The cartridge hub is driven from this motor to rewind the tape into the cartridge. Of course, shaft 213 is simultaneously driven and moves carriage 203 toward its starting position and carriage 202 follows along because of the coupling afforded by spring 276. This continues until either of two conditions is reached: either the carriages return to their starting positions before the tape is completely wound or the tape is wound onto the cartridge before the carriages reach home.

If the carriages return to their start position first, drive plate 212 of carriage 203 yields since it is only spring urged against the threads of shaft 213 and therefore the continued driving of the carriage hub causes no damage to the sensing mechanism. Ultimately, as the tape is fully restored, extractor 51 enters housing 146 to operate switch pair 161 and de-energize motor 165.

For the other condition that may be established, clutch 30 slips and prevents damage to the tape and its cartridge during the period in which the continued driving effect of motor 165 is used solely to restore carriages 202 and 203 fully to their starting positions. When these positions have been attained, switch pair 218 is opened by switch operator 221 of carriage 203 to de-energize motor 165.

When the reset has been accomplished, the machine has ejected the cartridge containing the repaired tape and is ready to execute its next normal cycle of operation.

*Control Circuitry*

The transport device operates from a conventional 110 volt alternating current source as shown in FIGURE 16. The switch 233 is connected in an A.C. power line input circuit and serves as the main power switch. The solenoid 187 which controls the safety brake and prevents tape from spilling in the event of a power failure is connected across the A.C. line immediately after switch 233 along with a voltage reducing transformer 278. The low voltage output of transformer 278 is connected to a rectifying device 281 which provides a source of direct current (D.C.) voltage.

The capstan motor 172 is electrically connected to power switch 233 by way of normally closed contact pair 223 associated with the sensing device and reset mechanism for use in conjunction with the broken-tape safety feature. The capstan motor thus is normally directly controlled by switch 233.

As previously explained, cam 121 controls a majority of the levers and linkages which, in turn, control the operation of the device. A driving mechanism is needed to both position the cam and simultaneously activate electrical circuitry which must cooperate with the cam to electrically control the tape transport operation. As shown in FIGURE 7, cam 121 is fastened to one end of a drive shaft 122 which is driven through a reduction gear assembly 201 mounted to the underside of deck 63. The other end of drive shaft 122 passes through a multi-section wafer switch 282 which is firmly fastened to the underside of gear box 283. A program motor 284 is mounted to gear box 283 and its drive shaft 285 is coupled to the gear box to rotate shaft 122.

The program switch 282 is constructed of four wafers respectively designated as the carry-over wafer 286, the program motor wafer 287, the take-up motor wafer 288, and the cartridge motor wafer 289. Wafers 286 and 287 cooperate to control the operation of program switch motor 284 while wafers 288 and 289 respectively control the take-up and cartridge motors. Each wafer is conventional in construction having a fixed outer segment carrying contact points and a movable inner segment, usually referred to as a rotor, which may carry one or more circuit connectors. The rotors are mounted upon drive shaft 122 and simultaneously change positions along with cam 121 as shaft 122 rotates.

Each wafer has twelve discrete electrical positions with positions 1, 3, 5, 7, 9 and 11 respectively designated as the index, start, play, rewind, slow rewind and escape positions. In contrast, positions 2, 4, 6, 8, 10 and 12 are required transition positions necessary to bring about coordination of the mechanical and electrical functions of the programming system. This will be explained further hereinafter.

The operation of the program system may best be explained with reference to FIGURE 16 if it is assumed that cartridges are positioned within the bin and on-off switch 233 is in the closed position. The rotors of the four wafers are in their index position as shown. With cartridges in the bin, lock out contact pair 74 positioned along side the bin is closed. Depressing play button 232 closes the contacts of switch 235 and energizes the program motor with A.C. potential derived from the input by way of contact 1 of wafer 287. The energized program motor moves the rotors of all the wafers to position 2. In this position wafer switch 287 is open but carry-over wafer 286 continues the A.C. circuit of the program motor through its contact 2 and the motor remains energized until the rotors reach the start position 3. The energizing circuit for the program motor is now opened and the motor stops rotating.

In positions 1 and 2 wafers 288 and 289 respectively apply a D.C. voltage to take-up and cartridge motors 164, 165. This prevents rotation of the take-up reel 32 so that extractor 137 remains in position within housing 146 when cartridges are being placed into or being fed upward from bin 31. It also prevents spindle 43 from rotating so that the cartridges may move freely within the bin. In position 3 full A.C. voltage is applied to take-up motor 164 while cartridge motor 165 continues to have D.C. voltage applied to it. Accordingly, the take-up reel withdraws tape from the cartridge very slowly due to the braking effect on the cartridge reel of the D.C. voltage applied to the cartridge motor.

After a predetermined length of tape has been wound on the take-up reel, contact pair 222 of the sensing mechanism 201 closes. This energizes program motor 284 through contact 3 of wafer switch 287 and contact 4 of carry-over wafer 286 continues this circuit until position 5, the play position, is reached.

In position 4 take-up motor 164 continues to be fully energized through take-up wafer 288 but in position 5 a low alternating current voltage is applied to its through contacts 291 of search switch 252 and a dropping resistor 292. In position 4 cartridge motor 165 still has the braking D.C. voltage; however, in position 5 this circuit is opened and no other circuit is complete to the cartridge motor. As shaft 122 rotates the rotors to the fourth and fifth positions, cam 121 moves pressure roller 143 and pressure pad 145 to the position shown in FIGURE 1. In this position, capstan 142 extracts the tape from the cartridge at the playing level and the low A.C. voltage applied to the take-up motor is sufficient to rotate the take-up reel to receive the tape as it leaves the capstan drive.

When the entire tape has been played, sensing system 201 closes contact pair 225 which completes an A.C. circuit through contact 5 of wafer 287 to the program motor to move the rotors to position 6. Contact 6 of carry-over wafer 286 continues this circuit to step the rotors to position 7, the rewind position, where the circuit for the program motor is opened at contact pair 216.

The 6th and 7th positions of wafer switch 288 are on open circuit and the A.C. voltage supply to take-up motor 164 is removed. Cartridge motor 165 in turn receives full A.C. voltage through wafer 289 in positions 6 and 7. In moving the rotors from positions 5 to 7, shaft 122 concurrently rotates cam 121 to move pressure roller 143 and pressure pad 145 away from capstan 142 and guide post 144, respectively. This allows the cartridge motor to wind the tape back into the cartridge at a fast rate with no difficulty.

The high speed rewind operation continues until all but a small predetermined amount of the tape has been returned to the cartridge. At this point contact pair 216 of sensing mechanism 201 is closed and completes a circuit to program motor 284 through contact 7 of program wafer 287. The program motor moves the rotors to position 8 and carry-over wafer 286 continues the circuit until the rotors reach position 9, the slow rewind position, where the program motor stops since contact pair 161 is open.

In position 8 take-up wafer 288 applies a D.C. voltage from rectifier 281 to take-up motor 164 to momentarily stop the rotation of the take-up reel and thereby halt the rewind operation to prevent damage to the coupler and extractor. In position 9 a lower D.C. voltage is applied to take-up motor 164 through a dropping resistor 293 and wafer 288. The cartridge wafer 289 continues to supply A.C. voltage to the cartridge motor in positions 8 and 9 thus the rewind operation resumes but at a much slower speed because of the loading effect of take-up motor 164.

When all of the tape has been returned to the cartridge, extractor 137 returns to its home position in housing 146. Switch pair 161 now closes and the program motor is energized through wafer 287. The wafers 286, 287 cooperate to continue energization of the program motor until the rotors have moved through positions 10, 11, and 12 to position 1.

In positions 10, 11, and 12 D.C. voltage is applied to take-up motor 164 through wafer 288 to prevent movement of the take-up reel. Cartridge wafer 289, however, makes no circuit to cartridge motor 165 in positions 10 and 12 but does apply a D.C. voltage to the motor in position 11. This keeps spindle 43 from rotating during a portion of the cartridge change cycle. In passing from position 9 to position 1, cam 121 activates feed mechanism 38 which moves a new cartridge to the playing level if one remains to be played and the entire program cycle repeats. However, if no cartridges remain to be played, play button 232 will be released by the automatic shut-off feature and the program motor will stop in index position 1. The lock out switch contact pair 74 and the play switch contacts 235 are in series and both must be closed before the cycle can again be started. If the play button were not released, i.e. the contacts of switch 235 were not opened, the program motor would start as soon as platform 64 became repressed when new cartridges were being placed into the bin.

In is sometimes desirable to interrupt the normal playing cycle of the tape and continue on to the next cartridge or to turn the machine off before the last cartridge has been completely played. Reject button 267 is provided for this purpose and has its contact pair electrically connected in parallel with contact pair 225 of sensing device 201. As previously explained the closing of contact pair 225 initiates a high-speed rewind operation. This same automatic rewind condition may be brought about at the user's election by depressing reject button 267 when the machine is in the play condition. In all other modes of operation, reject control 267 is ineffective.

Reset button 268 is provided to reset or realign sensing mechanism 201 in the event that the tape breaks during the transportation of it. Should the tape break, normally closed contact pair 223 on carriage 203 will open as previously explained. Contacts 223 are in series with power switch 233 and, when opened, remove all power from most of the transport mechanism; however, transformer 278 and solenoid 187 still remain energized. Before the tape can be repaired, pressure roller 143 and pad 145 must be raised through the use of the search control 252. After the tape is repaired, reset switch 268 must be depressed to reset mechanism 201.

The reset switch energizes cartridge motor 165 through normally closed switch contact pairs 162 and 221 which are connected in parallel to the A.C. source. For successful realignment of the sensing mechanism and return of the repaired tape to the cartridge, button 268 must remain depressed until the cartridge motor stops and this will occur only when both switch contact pair 162 and 221 are open.

When the tape has been fully rewound into the cartridge, contact pair 162 is opened by the homing of extractor 137 in housing 146. Contact pair 221 opens when carriage 202 reaches its home position during the reset operation. When both contact pairs 162 and 221 have been opened cartridge motor 165 is de-energized. As an incident to the reset operation, cam 121 and the rotors of the wafer switches must be returned to position 1 to permit normal operation when the reset operation has been completed. Actually, the program mechanism automatically returns to the index position because sensing mechanism 201, in returning to its home position, actuates the same switch contacts as those closed during the regular rewind.

When the reset button is depressed, the control circuits from wafer switches 288 and 289 to the take-up and cartridge motors are open; therefore, the potentials normally applied to these motors by such switches are not applied.

The search switch control 252 permits moving the tape at a relatively high speed in either direction to search out a desired portion of the recorded program. The control circuitry of search control 252 includes the twelve contact wafer switch 291. The rotor of the switch is made up of two asymmetrical contact strips 294 and 295 which respectively apply appropriate voltages to the take-up and cartridge motors by way of switch 235 but only during intervals in which the rotors of the take-up and cartridge switches 288 and 289 are in the fifth position. This is the only position through which the circuitry of search switch 291 may be extended to take-up and cartridge motors 164 and 165.

Search control 252 may be moved to either a forward or a reverse search position and, in either case, play switch 235 is opened by the release of button 232 as previously described. The forward search corresponds to a displacement of the rotor of switch 291 in a counterclockwise direction as viewed in FIGURE 16 and reverse search corresponds to clockwise displacement of that rotor. The rotor position for forward search causes circuit connections to be completed at both contacts designated "FWD" and the reverse search position completes a circuit involving both contcts designated "REV." It is apparent from inspection of FIGURE 16 that displacement of the search switch to either of these searching positions causes a temporary closure of the rotor with intermeidate contacts designed 296–299, inclusive.

As the search control is moved in the clockwise direction, the circuit from take-up motor is extended from contact 5 of switch 288, through rotor segment 295, to contact 298 through normally closed contact pair 226 to the A.C. bus. Concurrently, the circuit extends from a parallel connection contact 298 and contact 296, rotor segment 296 and position 5 of switch 287 which connects with cartridge motor 165. This applies full A.C. voltage manually to both motors to interrupt the normal movement of the tape. A similar circuit may be traced, involving contacts 297 and 299 as the search control is rotated counterclockwise to establish forward search. Consequently, normal tape movement is interrupted as search control 252 is displaced to establish fast tape movement for searching in either direction.

With the search switch displaced in a clockwise direction to the contact "REV" terminals, A.C. voltage is applied to cartridge motor 165 through contact 5 of switch 289, rotor segment 295 and the upper one of the "REV" contacts of switch 291 which leads directly to the A.C. supply. The other "REV" contact of switch 291 is on open circuit at contact pair 227 so that the take-up motor 164 is de-energized. When the search in this direction has been completed, control 252 is returned to the position represented in FIGURE 16. In this position both the cartridge and take-up motors 165 and 164 are connected to the A.C. supply through wafer switch 291 and contacts on switch 235. This of course stops the tape movement until play button 232 is depressed to resume normal operation.

To search in the forward direction, search control 252 is displaced in a counterclockwise direction and it connects with the terminals "FWD." In this condition take-up motor 164 is energized through terminal 5 of switch 288 and the upper one of the "FWD" contacts of switch 291. The circuit to cartridge motor 165, however, is interrupted since the other "FWD" contact is on open circuit at contact pair 227. After the search has been completed and the search control returned to the position indicated in FIGURE 16, motors 164 and 165 are again concurrently energized to stop tape movement.

Contact pairs 226 and 227 are safety devices which impose limits on the search function. These switch pairs are supported by carriage 203 and are actuated by engagement with actuator 231 at opposite limits of the carriage travel. When actuated normally closed contact pair 226 is open to de-energize the motor through which the searching has been conducted and contact pair 227 is closed to apply a D.C. or braking potential to the other motor which, up to this instant, has been completely de-energized because contact pair 227 has been opened. This stops the search rapidly and imposes limits for searching in both the forward and reverse directions. The play or rewind controls of the tape deck may then be used to return the instrument to one of its normal operating conditions or alternatively, the search control may be rotated to its other extreme position.

Conductors 301 leading from the pick-up or transcribing head 33 connect with an audio or other reproduction system of conventional construction. Since no claim of novelty is predicated on this signal reproducing circuitry, that circuit arrangement has not been shown.

The described transport mechanism may accommodate a group of tape cartridge or a single cartridge as the user desires and it avoids certain disadvantages of prior devices in that the user is not required to thread the tape through the instrument. The sensing mechanism in conjunction with the programming system permits the transport to be fully automatic in its play of one or a series of cartridges while reducing to a minimum the manipulative steps required of the user. The search feature permits selected passages of any given tape to be located quickly should the user prefer to hear portions rather than the entirety of a given tape. Additionally, the instrument has a number of mechanical advantages including the self-aligning feature of the spindle assembly, the braking mechanism included in the cartridges, the cartridge feed and automatic shut-off features.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Reeling apparatus for winding a flexible tape retained upon a storage reel comprising: a support for receiving said storage reel; a take-up reel; a transport mechanism for moving said tape between said storage and take-up reels; first sensing means for continuously indicating the number of turns of said tape on said storage reel independently of the thickness of said tape; second sensing means for continuously indicating the number of turns of said tape on said take-up reel independently of the thickness of said tape; and switch means coupled to and conjointly controlled by said first and second sensing means for controlling the operation of said transport mechanism.

2. Reeling apparatus for winding a flexible tape retained upon a storage reel comprising: a support for receiving said storage reel; a take-up reel; a transport mechanism for moving said tape between said storage and take-up reels; first sensing means for continuously indicating the number of turns of said tape on said storage reel independently of the thickness of said tape; second sensing means for continuously indicating the number of turns of said tape on said take-up reel independently of the thickness of said tape; and switch means responsive to the indication by said first and second sensing means of a predetermined differential number of turns of said member wrapped around said storage and take-up reels for controlling the operation of said transport mechanism.

3. Reeling apparatus for winding a flexible tape retained upon a storage reel comprising: a support for receiving said storage reel; a take-up reel; a transport mechanism for moving said tape between said storage and take-up reels; first sensing means for continuously registering the number of revolutions of said storage reel in response to movement of said stape; second sensing means for continuously registering the number of revolutions of said take-up reel in response to said movement of said tape; and switch means coupled to and conjointly controlled by said first and second sensing means for controlling the operation of said transport mechanism.

4. Reeling apparatus for winding a flexible tape retained upon a storage reel comprising: a support for receiving said storage reel; a take-up reel; a transport mechanism for moving said tape between said storage and take-up reels; a motor coupled to said transport mechanism; first sensing means for continuously indicating the number of turns of said tape on said storage reel independently of the thickness of said tape; second sensing means for continuously indicating the number of turns of said tape on said take-up reel independently of the thickness of said tape; means for braking the rotation of one of said reels; and switch means coupled to and conjointly controlled by said first and second sensing means for controlling the operation of said motor and said braking means.

5. Reeling apparatus for winding a flexible tape retained upon a storage reel comprising: a support for receiving said storage reel; a take-up reel; a transport mechanism for moving said tape between said storage and take-up reels; first sensing means, including a lead screw driven with said storage reel and a carriage movable therealong, for continuously registering the number of revolutions of said storage reel in response to movement of said tape; second sensing means, including a lead screw driven with said take-up reel and a carriage movable therealong for continuously registering the number of revolutions of said take-up reel in response to said movement of said tape; and switch means conjointly controlled by the relative positions of said carriages for controlling the operation of said transport mechanism.

6. Reeling apparatus for winding a flexible tape retained upon a storage reel comprising: a support for receiving said storage reel; a take-up reel; a transport mechanism for moving said tape between said storage and take-up reels; first sensing means, including a lead screw driven with said storage reel and a carriage movable therealong in a particular direction during the paying out of said tape, for continuously registering the number of revolutions of said storage reel in response to movement of said tape; second sensing means, including a lead screw driven with said take-up reel and a carriage movable therealong in said direction during the taking up of said tape, for continuously registering the number of revolutions of said take-up reel in response to said movement of said tape; and switch means conjointly controlled by the relative positions of said carriages for controlling the operation of said transport mechanism.

7. Reeling apparatus for winding a flexible tape retained upon a storage reel comprising: a support for receiving said storage reel; a take-up reel; a transport mechanism including first and second alternating-current motors for moving said tape between said storage and take-up reels; first sensing means for continuously indicating the number of turns of said tape on said storage reel independently of the thickness of said tape; second sensing means for continuously indicating the number of turns of said tape on said take-up reel independently of the thickness of said tape; a source of alternating-current potential; a source of direct-current potential; and switch means coupled to and conjointly controlled by said first and second sensing means for selectively connecting said alternating current and direct current potential sources to said first and second motors.

8. Reeling apparatus for winding a flexible tape retained upon a storage reel comprising: a support for receiving said storage reel; a take-up reel; a transport mechanism for moving said tape between said storage and take-up reels; first sensing means, including a lead screw driven with said storage reel and a carriage movable therealong in a particular direction during the paying out of said tape, for continuously registering the number of revolutions of said storage reel in response to said movement of said tape; second sensing means, including a lead screw driven with said take-up reel and a carriage movable therealong in said direction during the taking up of the tape, for continuously registering the number of revolutions of said take-up reel in response to said movement of said tape; and switch means conjointly controlled by the relative positions of said carriages for terminating the movement of said tape from said storage reel to said take-up reel.

9. Reeling apparatus for winding a flexible tape retained upon a storage reel comprising: a support for receiving said storage reel; a take-up reel; a transport mechanism for moving said tape between said storage and take-up reels; first sensing means, including a lead screw driven with said storage reel and a carriage movable therealong in a particular direction during the paying out of said tape, for continuously registering the number of revolutions of said storage reel in response to said movement of said tape; second sensing means, including a lead screw driven with said take-up reel and a carriage movable therealong in said direction during the taking up of the tape, for continuously registering the number of revolutions of said take-up reel in response to said movement of said tape; and switch means conjointly controlled by the relative positions of said carriages for terminating the movement of said tape from said storage reel to said take-up reel and for initiating the rewinding of said tape on said storage reel.

10. Reeling apparatus for winding a flexible tape retained upon a storage reel comprising: a support for receiving said storage reel; a take-up reel; a transport mechanism for moving said tape between said storage and take-up reels; first sensing means, including a first lead screw driven with said storage reel and a carriage movable therealong in a particular direction during the paying of said tape, for continuously registering the number of revolutions of said storage reel in response to the movement of said tape; second sensing means, including a second lead screw parallel to said first lead screw and driven with said take-up reel and a carriage movable therealong in said direction during the taking up of said tape, for continuously registering the number of revolutions of said take-up reel in response to said movement of said tape; and switch means supported at least in part by said carriages and conjointly controlled by the relative positions of said carriages for controlling the operation of said transport mechanism.

11. Reeling apparatus for winding a flexible tape retained upon a storage reel comprising: a support for receiving said storage reel; a take-up reel; a transport mechanism, including a storage reel motor and a take-up reel motor, for moving said tape between said storage and take-up reels; first sensing means, including a first lead screw driven by said storage reel motor at the same rate as said storage reel and a carriage movable therealong in a particular direction during the paying out of said tape, for continuously registering the number of revolutions of said storage reel in response to movement of said tape; second sensing means, including a second lead screw parallel to said first lead screw and driven by said take-up reel motor at the same rate as said take-up reel and a carriage movable therealong in said direction during the taking up of said tape, for continuously registering the number of revolutions of said take-up reel in response to the movement of said tape; and switch means supported at least in part by said carriages and conjointly controlled by the relative positions of said carriages for controlling the operation of said transport mechanism.

References Cited in the file of this patent

UNITED STATES PATENTS

| | | |
|---|---|---|
| 2,584,733 | Owens | Feb. 5, 1952 |
| 2,928,620 | Stavrakis et al. | Mar. 15, 1960 |
| 2,943,804 | Loewe et al. | July 5, 1960 |
| 2,944,750 | Hall | July 12, 1960 |
| 2,983,460 | Wright | May 9, 1961 |
| 3,004,729 | Barkhuff | Oct. 17, 1961 |